(12) United States Patent
Endo et al.

(10) Patent No.: US 6,937,816 B2
(45) Date of Patent: Aug. 30, 2005

(54) SHOOTING APPARATUS AND LENS BARREL

(75) Inventors: Hiroshi Endo, Asaka (JP); Yoshihiro Ito, Asaka (JP); Takehiko Senba, Asaka (JP); Akio Omiya, Saitama (JP); Yasuhiko Tanaka, Saitama (JP)

(73) Assignees: Fuji Photo Film Co., Ltd., Kanagawa (JP); Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/829,302

(22) Filed: Apr. 22, 2004

(65) Prior Publication Data

US 2004/0228626 A1 Nov. 18, 2004

(30) Foreign Application Priority Data

May 15, 2003 (JP) ........................................ 2003-137118
Mar. 4, 2004 (JP) ........................................ 2004-060831

(51) Int. Cl.[7] ............................................. G03B 17/04
(52) U.S. Cl. ........................ 396/79; 396/349; 396/451; 348/375
(58) Field of Search ...................... 396/79, 348, 349, 396/451, 462; 348/373–376; 359/694–698, 822–826

(56) References Cited

U.S. PATENT DOCUMENTS

| | | | | |
|---|---|---|---|---|
| 2,176,679 A | * | 10/1939 | Hubert | 396/349 |
| 5,592,250 A | * | 1/1997 | Shimizu | 396/79 |
| 5,598,241 A | * | 1/1997 | Nomura et al. | 396/79 |
| 6,835,006 B2 | * | 12/2004 | Tanaka et al. | 396/349 |
| 2005/0002665 A1 | * | 1/2005 | Ito et al. | 396/349 |

FOREIGN PATENT DOCUMENTS

JP 05-034769 A 2/1993

\* cited by examiner

*Primary Examiner*—W. B. Perkey
(74) *Attorney, Agent, or Firm*—Sughrue Mion, PLLC

(57) ABSTRACT

It is an object of the present invention to provide a shooting apparatus which is thinner than a conventional shooting apparatus. A lens barrel is brought into an accommodated state from a shooting state by retracting at least one of lens groups constituting the shooting lens from an optical axis, and by bringing at least a portion of one of the other lens groups remaining on the optical axis or an image pickup element into a non-using state in which an opening is left opening at a predetermined opening diameter.

26 Claims, 32 Drawing Sheets

SHOOTING APPARATUS AND LENS BARREL

BACKGROUND OF THE INVENTION

1. Field of the Invention

The present invention relates to a shooting apparatus which images a subject light on an image pickup element to produce an image signal, and to a lens barrel capable of changing a length thereof.

2. Description of the Related Art

In recent years, in addition to cameras for taking an exposure on a conventional silver-salt film, digital cameras have rapidly become widespread. Such a digital camera includes an image pickup element such as a CCD image pickup element or an MOS image pickup element, and which forms an image of a subject on the image pickup element and produce an image signal.

In this digital camera also, it is strongly required to enhance the shooting performance and carrying-easiness. There is a digital camera having a lens barrel incorporating, therein, a shooting lens comprising lens groups. In this digital camera, the focal length is variable so that shooting at desired angle of view can be carried out, and in order to enhance the carrying-easiness of the digital camera, the lens barrel is retracted in a camera body such that distances between the lens groups constituting the shooting lens become shorter than the minimum necessary distance required for shooting at the time of non-shooting, and the lens barrel is advanced such that the distances between the lens groups become the minimum necessary distance required for shooting at the time of shooting (see Japanese Patent Application Laid-open No. 5-34769).

There is a widely employed shooting lens having a variable focal length, the shooting lens includes three or more lens groups, a focus lens is disposed as the last lens group in the optical axis direction, the focus lens is moved in the optical axis direction to adjust a focus. Usually, a member for controlling a light amount such as a shutter or aperture is provided between the front lens group and the rear lens group or between the rear lens group and the focus lens. In recent years, a distance between the lens groups or a distance between the lens group and the light amount control member such as the shutter is shortened as short as possible to retract the lens groups so that the thickness of the camera is reduced and carrying-easiness is further enhanced. In the future, the thickness of the camera may further be reduced by retracting any of the lens groups constituting the shooting lens from the optical axis. However, there is a limit for reducing the thickness.

SUMMARY OF THE INVENTION

In view of the above circumstances, it is an object of the present invention to provide thinner shooting apparatus and lens barrel as compared with a conventional digital apparatus.

To achieve the above object, the present invention provides a shooting apparatus which images a subject light on an image pickup element to produce an image signal, comprising a lens barrel which incorporates, therein, a shooting lens comprising a plurality of lens groups, a length of the lens barrel can be changed between an accommodated state having a relatively short barrel length and a shooting state having a relatively long barrel length, wherein the lens barrel comprises a lens retracting mechanism which allows at least one of the lens groups to retract from a shooting optical axis when the lens barrel is brought into the accommodated state, and which allows the retracted lens group to advance to the shooting optical axis when the lens barrel is brought into the shooting state, and a light amount control member which is in a using state in which an amount of shooting light passing through the shooting lens is controlled when the lens barrel is in the shooting state, and which is in non-using state in which an opening is left opening at a predetermined opening diameter when the lens barrel is in the accommodated state, and which receives at least one of the lens groups in the opening when the lens barrel is in the accommodated state.

In the shooting apparatus of this invention, the lens barrel is brought into an accommodated state from a shooting state by retracting at least one of lens groups constituting the shooting lens from an optical axis, and by bringing at least a portion of one of the other lens groups remaining on the optical axis or an image pickup element into a non-using state in which an opening is left opening at a predetermined opening diameter. Thus, the shooting apparatus of the invention can be reduced in thickness as compared with the conventional technique.

The shooting lens may comprise three lens groups, i.e., a front lens group, a rear lens group and a focus lens arranged in this order from forward in the optical axis direction, a focal length can be changed, and a focus may be adjusted by moving the focus lens.

The light amount control member of the shooting apparatus of this invention may be a lens shutter or an aperture member, or a member which functions as both the shutter member and the aperture member.

In the shooting apparatus of this invention, it is preferable that the shooting lens comprises three lens groups, i.e., a front lens group, a rear lens group and a focus lens arranged in this order from forward in the optical axis direction, the light amount control member is fixed to a rear lens group guide frame which defines a position of the rear lens group in the optical axis direction, the lens retracting mechanism retracts the focus lens from the shooting optical axis when the lens barrel is brought into the accommodated state, the light amount control member receives the image pickup element in the opening when the lens barrel is in the accommodated state.

In the shooting apparatus of this invention, it is preferable that the shooting lens comprises three lens groups, i.e., a front lens group, a rear lens group and a focus lens arranged in this order from forward in the optical axis direction, the light amount control member is fixed to a rear lens group guide frame which defines a position of the rear lens group in the optical axis direction, the lens retracting mechanism retracts the focus lens from the shooting optical axis when the lens barrel is brought into the accommodated state, the light amount control member receives the front lens group in the opening when the lens barrel is in the accommodated state.

In the shooting apparatus of this invention, it is preferable that the shooting lens comprises three lens groups, i.e., a front lens group, a rear lens group and a focus lens arranged in this order from forward in the optical axis direction, the light amount control member is fixed to a rear lens group guide frame which defines a position of the rear lens group in the optical axis direction, the lens retracting mechanism includes a rear lens group holding frame which holds the rear lens group and is rotatably supported by the rear lens group guide frame, the rear lens group holding frame is turned to retract the rear lens group from the shooting optical axis when the lens barrel is brought into the accommodated state, the focus lens is received in the opening of the light amount control member when the lens barrel is in the accommodated state.

In the shooting apparatus of this invention, it is preferable that the shooting lens comprises three lens groups, i.e., a front lens group, a rear lens group and a focus lens arranged in this order from forward in the optical axis direction, the light amount control member is biased by a spring in a direction away from a rear lens group guide frame which defines a position of the rear lens group in the optical axis direction, and is supported by the rear lens group guide frame, the lens retracting mechanism retracts the focus lens from the shooting optical axis when the lens barrel is brought into the accommodated state, the light amount control member is pushed toward the rear lens group guide frame and the rear lens group is received in the opening of the light amount control member when the lens barrel is brought into the accommodated state.

To achieve the above object, the invention also provides a lens barrel incorporating, therein, a shooting lens comprising a plurality of lens groups, in which a length of the lens barrel can be changed between an accommodated state having a relatively short barrel length and a shooting state having a relatively long barrel length, the lens barrel comprising a lens retracting mechanism which allows at least one of the lens groups to retract from a shooting optical axis when the lens barrel is brought into the accommodated state, and which allows the retracted lens group to advance to the shooting optical axis when the lens barrel is brought into the shooting state, and a light amount control member which is in a using state in which an amount of shooting light passing through the shooting lens is controlled when the lens barrel is in the shooting state, and which is in non-using state in which an opening is left opening at a predetermined opening diameter when the lens barrel is in the accommodated state, and which receives at least one of the lens groups in the opening when the lens barrel is in the accommodated state.

In the lens barrel of this invention, the lens barrel is brought into an accommodated state from a shooting state by retracting at least one of lens groups constituting the shooting lens from an optical axis, and by bringing at least a portion of one of the other lens groups remaining on the optical axis or an image pickup element into a non-using state in which an opening is left opening at a predetermined opening diameter. Thus, the lens barrel of the invention can be reduced in thickness as compared with the conventional technique.

The lens barrel of the present invention may be the unit type incorporating an interchangeable lens, and further, may be a lens barrel integrally incorporating an image pickup element therein.

The shooting lens may comprise three lens groups, i.e., a front lens group, a rear lens group and a focus lens arranged in this order from forward in the optical axis direction, a focal length can be changed, and a focus may be adjusted by moving the focus lens.

The light amount control member of the lens barrel of this invention may be a lens shutter or an aperture member, or a member which functions as both the shutter member and the aperture member.

In the lens barrel of this invention, it is preferable that the shooting lens comprises three lens groups, i.e., a front lens group, a rear lens group and a focus lens arranged in this order from forward in the optical axis direction, the light amount control member is fixed to a rear lens group guide frame which defines a position of the rear lens group in the optical axis direction, the lens retracting mechanism retracts the focus lens from the shooting optical axis when the lens barrel is brought into the accommodated state, the light amount control member receives the image pickup element in the opening when the lens barrel is in the accommodated state.

In the lens barrel of this invention, it is preferable that the shooting lens comprises three lens groups, i.e., a front lens group, a rear lens group and a focus lens arranged in this order from forward in the optical axis direction, the light amount control member is fixed to a rear lens group guide frame which defines a position of the rear lens group in the optical axis direction, the lens retracting mechanism retracts the focus lens from the shooting optical axis when the lens barrel is brought into the accommodated state, the light amount control member receives the front lens group in the opening when the lens barrel is in the accommodated state.

In the lens barrel of this invention, it is preferable that the shooting lens comprises three lens groups, i.e., a front lens group, a rear lens group and a focus lens arranged in this order from forward in the optical axis direction, the light amount control member is fixed to a rear lens group guide frame which defines a position of the rear lens group in the optical axis direction, the lens retracting mechanism includes a rear lens group holding frame which holds the rear lens group and is rotatably supported by the rear lens group guide frame, the rear lens group holding frame is turned to retract the rear lens group from the shooting optical axis when the lens barrel is brought into the accommodated state, the focus lens is received in the opening of the light amount control member when the lens barrel is in the accommodated state.

In the lens barrel of this invention, it is preferable that the shooting lens comprises three lens groups, i.e., a front lens group, a rear lens group and a focus lens arranged in this order from forward in the optical axis direction, the light amount control member is biased by a spring in a direction away from a rear lens group guide frame which defines a position of the rear lens group in the optical axis direction, and is supported by the rear lens group guide frame, the lens retracting mechanism retracts the focus lens from the shooting optical axis when the lens barrel is brought into the accommodated state, the light amount control member is pushed toward the rear lens group guide frame and the rear lens group is received in the opening of the light amount control member when the lens barrel is brought into the accommodated state.

As explained above, according to the present invention, it is possible to reduce a thickness of a shooting apparatus as compared with the conventional apparatus.

DESCRIPTION OF THE PREFERRED EMBODIMENTS

Embodiments of the present invention will be described below.

Figure 1:
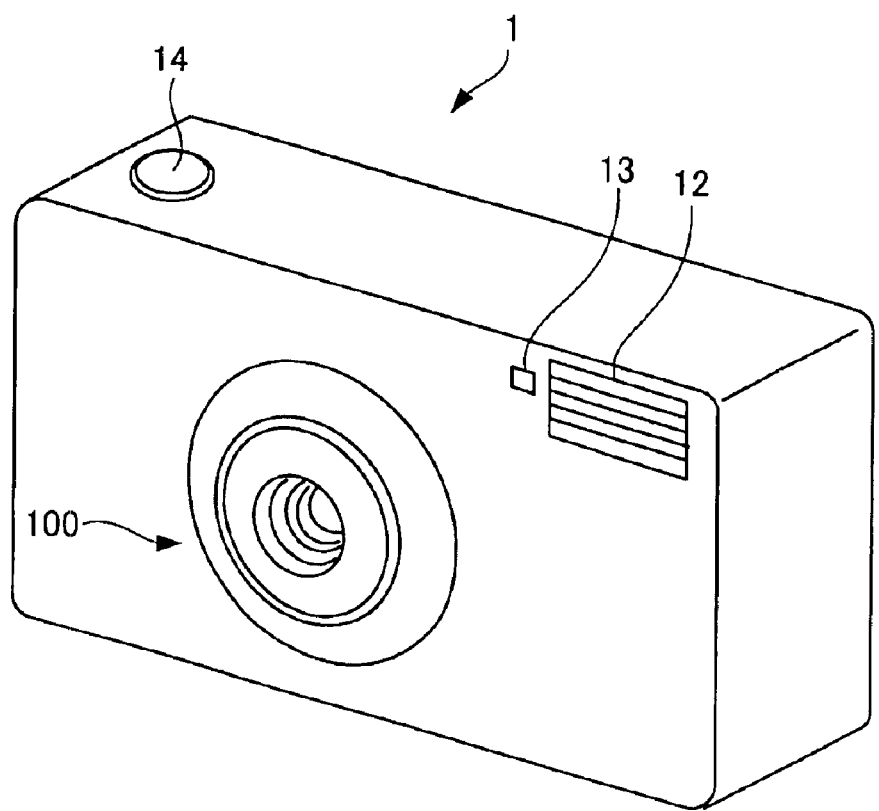
FIG. 1 is a perspective view of an outward appearance of a digital camera of a first embodiment of the present invention.
Figure 2:
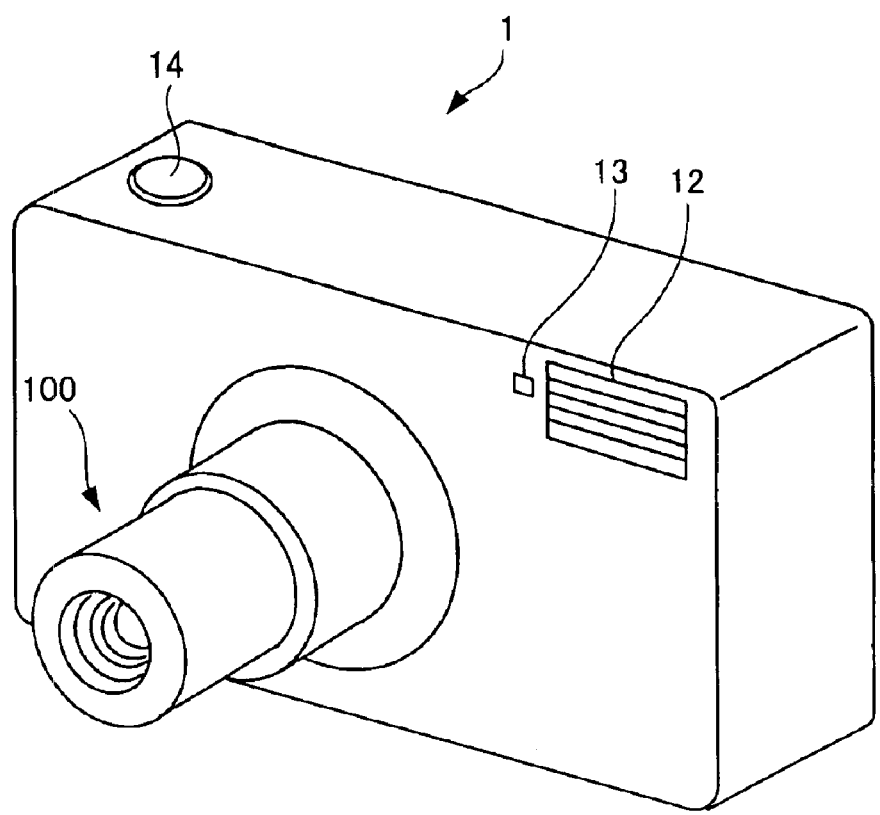
FIG. 2 is a perspective view of the outward appearance of the digital camera of the first embodiment of the invention.

FIGS. 1 and 2 are perspective views of an outward appearance of a digital camera of a first embodiment of the present invention.

FIG. 1 shows a retracted state of a lens barrel 100 incorporating a zoom lens of a digital camera 1 of this embodiment. FIG. 2 shows an advanced state of the lens barrel 100 of the digital camera 1.

A shooting lens having three groups of lenses are incorporated in the lens barrel 100 of the digital camera 1 shown in FIGS. 1 and 2 as will be described later. A focal length is adjusted by moving the lens groups in an optical axis direction, and the focus is adjusted by moving a focus lens which is one of the three groups of lenses in the optical axis.

An auxiliary light-emitting window 12 and a viewer object window 13 are disposed on an upper portion of a front surface of the digital camera 1 shown in FIGS. 1 and 2. A shutter button 14 is disposed on an upper surface of the digital camera 1.

The digital camera 1 is provided on its back surface (not shown) with zoom operation switches. If one of the zoom operation switches is pushed, the lens barrel 100 advances toward a telephotographic side while it is pushed, and if the other zoom operation switch is pushed, the lens barrel 100 moves toward a wide-angle side while it is pushed.

Figure 3:
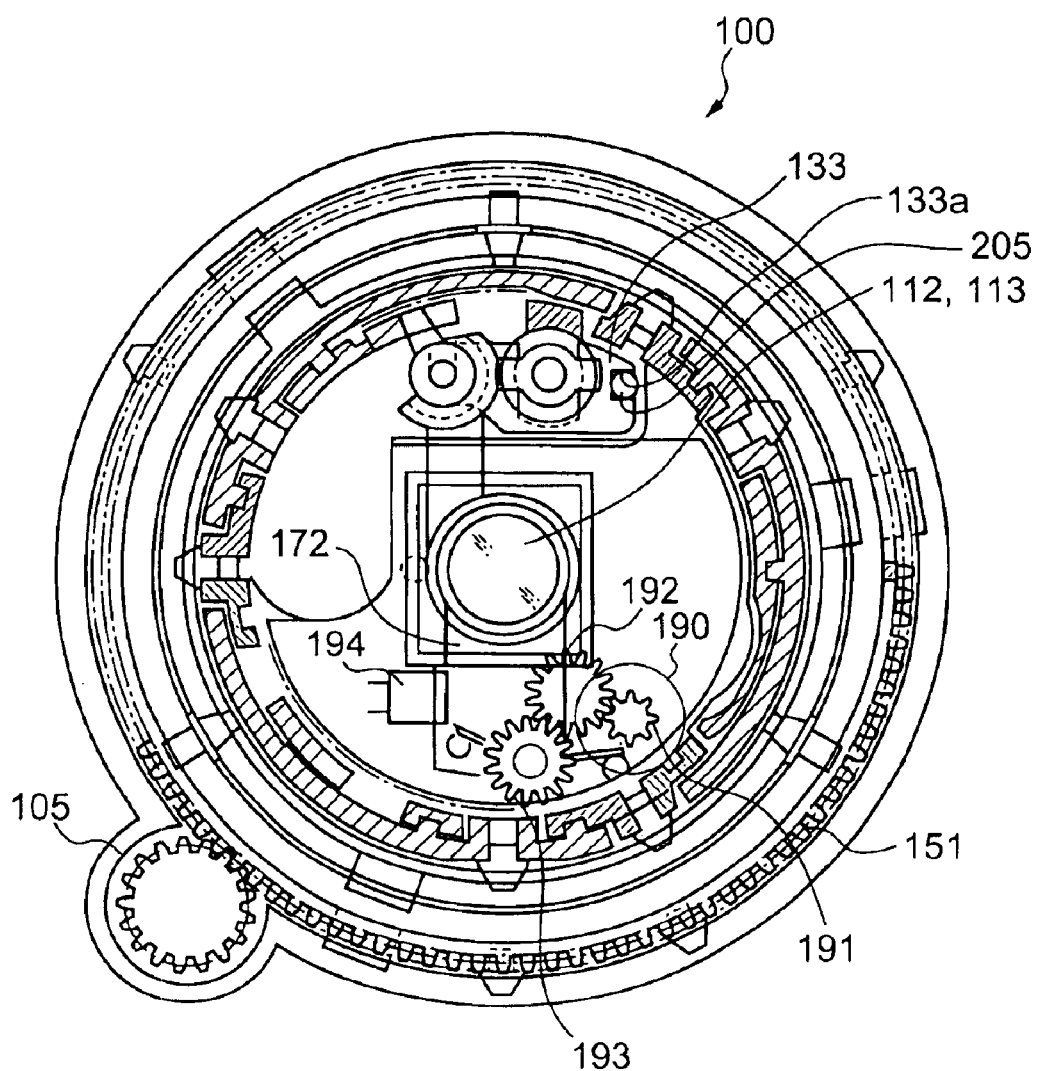
FIG. 3 is a schematic diagram showing essential parts of a lens barrel in its advanced state of the digital camera of the first embodiment of the invention shown in FIGS. 1 and 2 as viewed from an optical axis direction.
Figure 4:
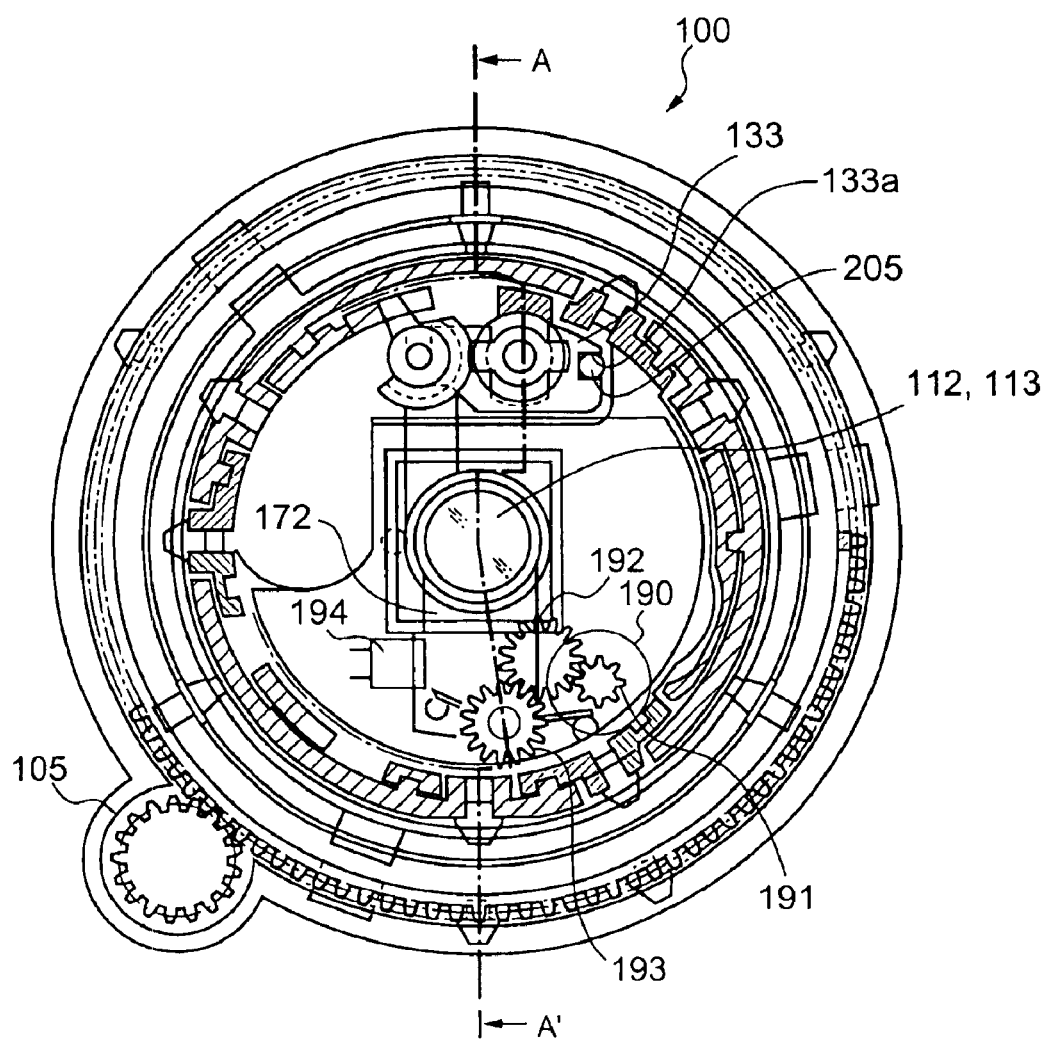
FIG. 4 is a sectional view that is the same as FIG. 3 but showing a line A–A'.
Figure 5:
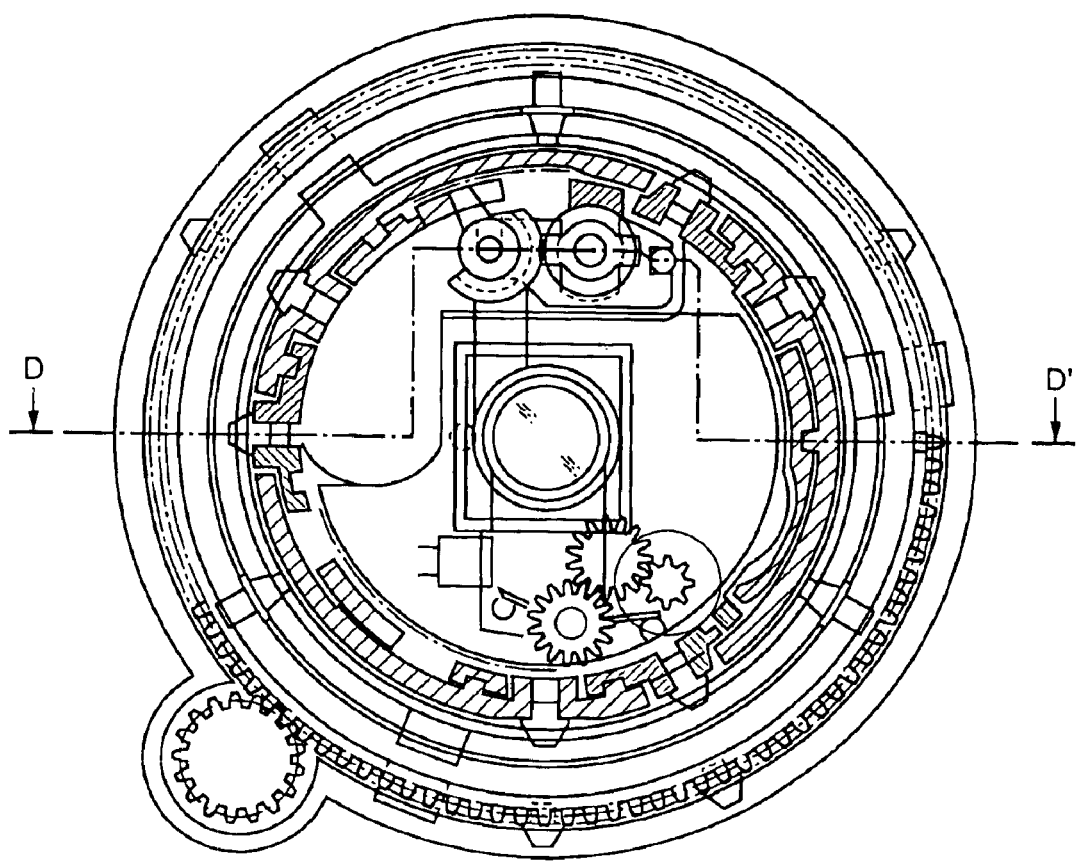
FIG. 5 is a sectional view that is the same as FIG. 3 but showing a line D–D'.
Figure 6:
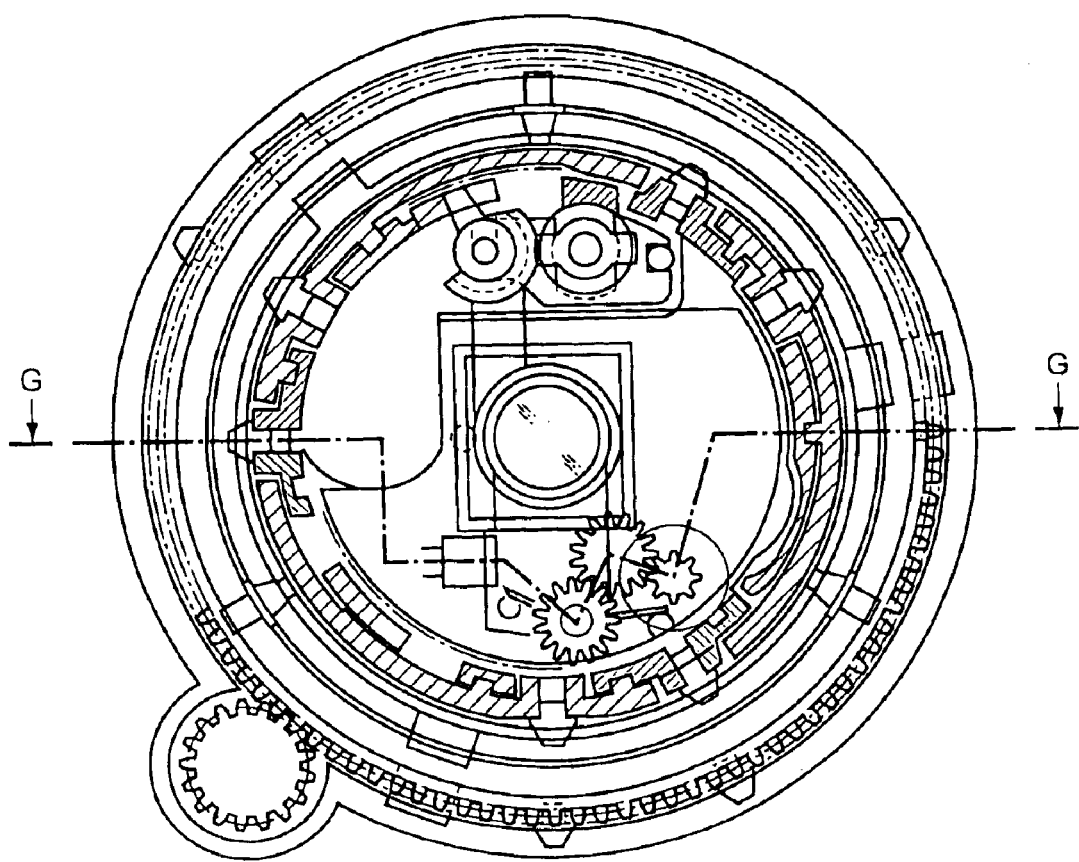
FIG. 6 is a sectional view that is the same as FIG. 3 but showing a line G–G'.
Figure 7:
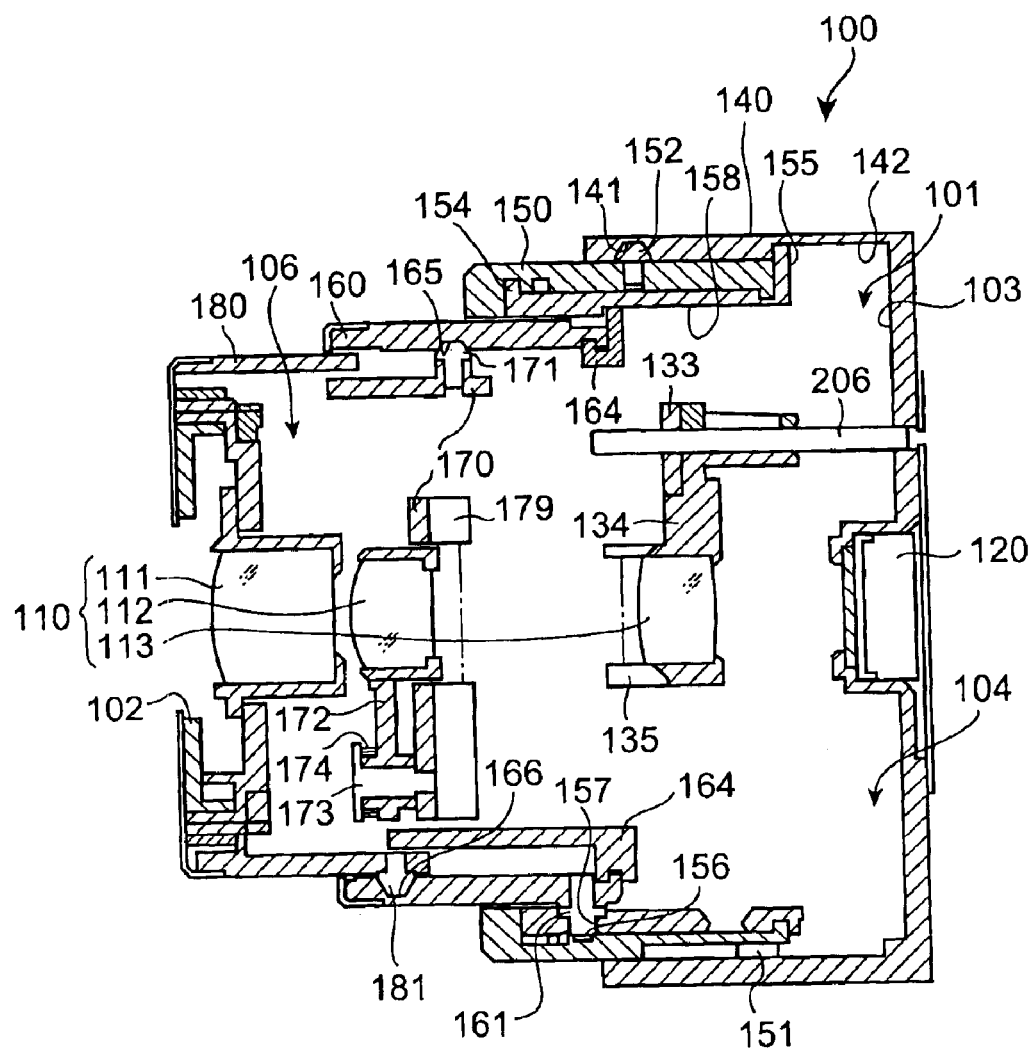
FIG. 7 is a sectional view showing a state of tele-edge having the longest focal length taken along the line A–A' in FIG. 4.
Figure 8:
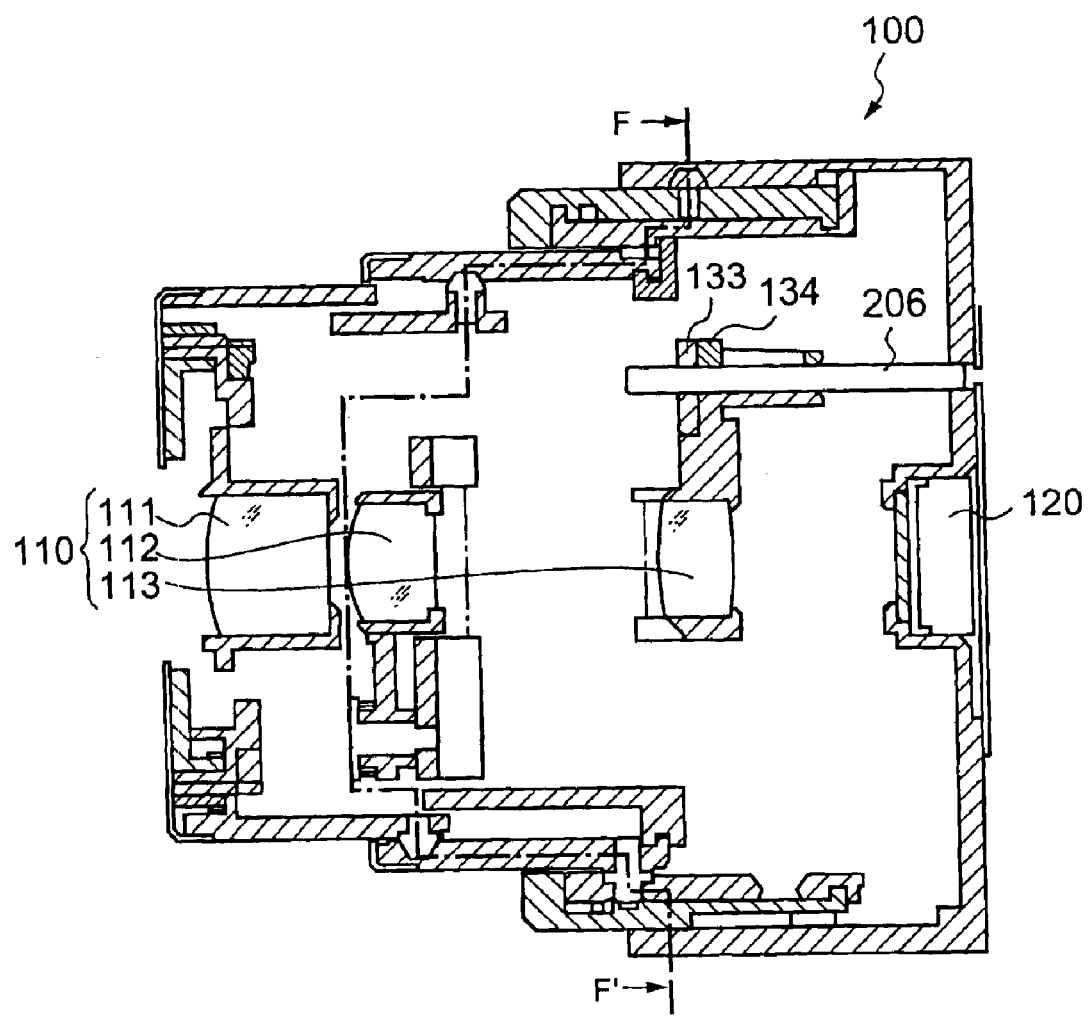
FIG. 8 is a sectional view that is the same as FIG. 7 but showing a line F–F'.
Figure 9:
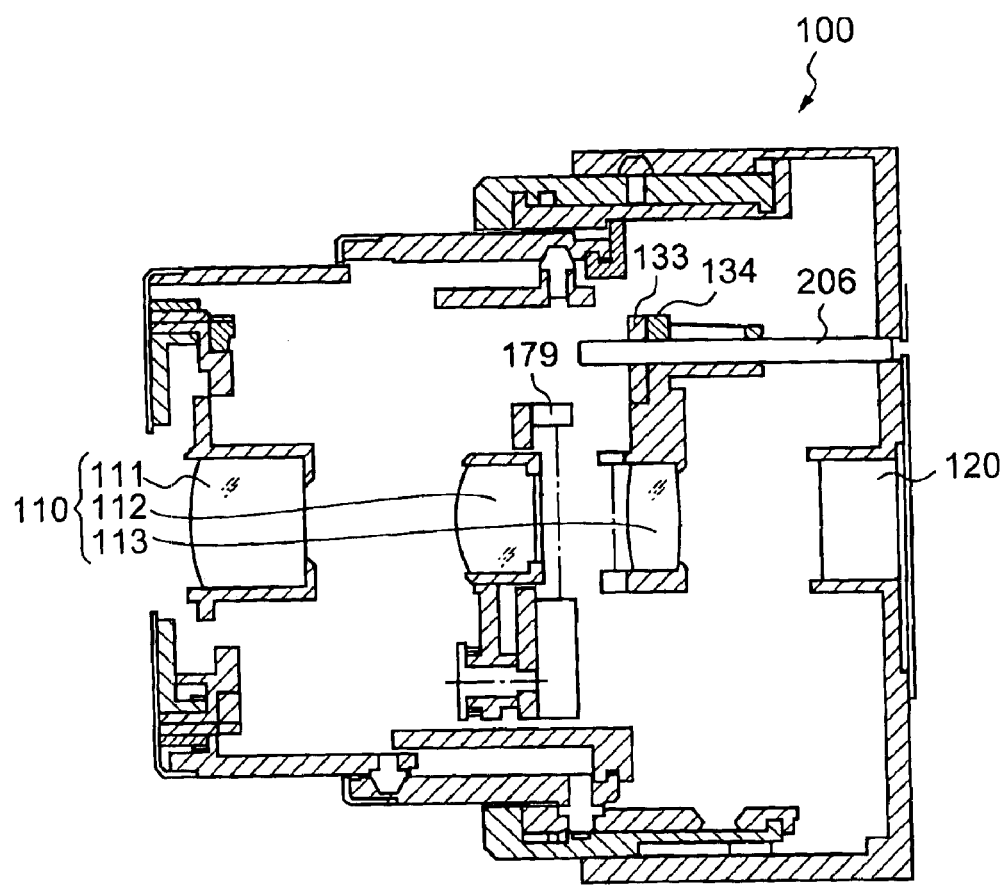
FIG. 9 is a sectional view showing a state of wide-edge having the shortest focal length taken along the line A–A' in FIG. 4.
Figure 10:
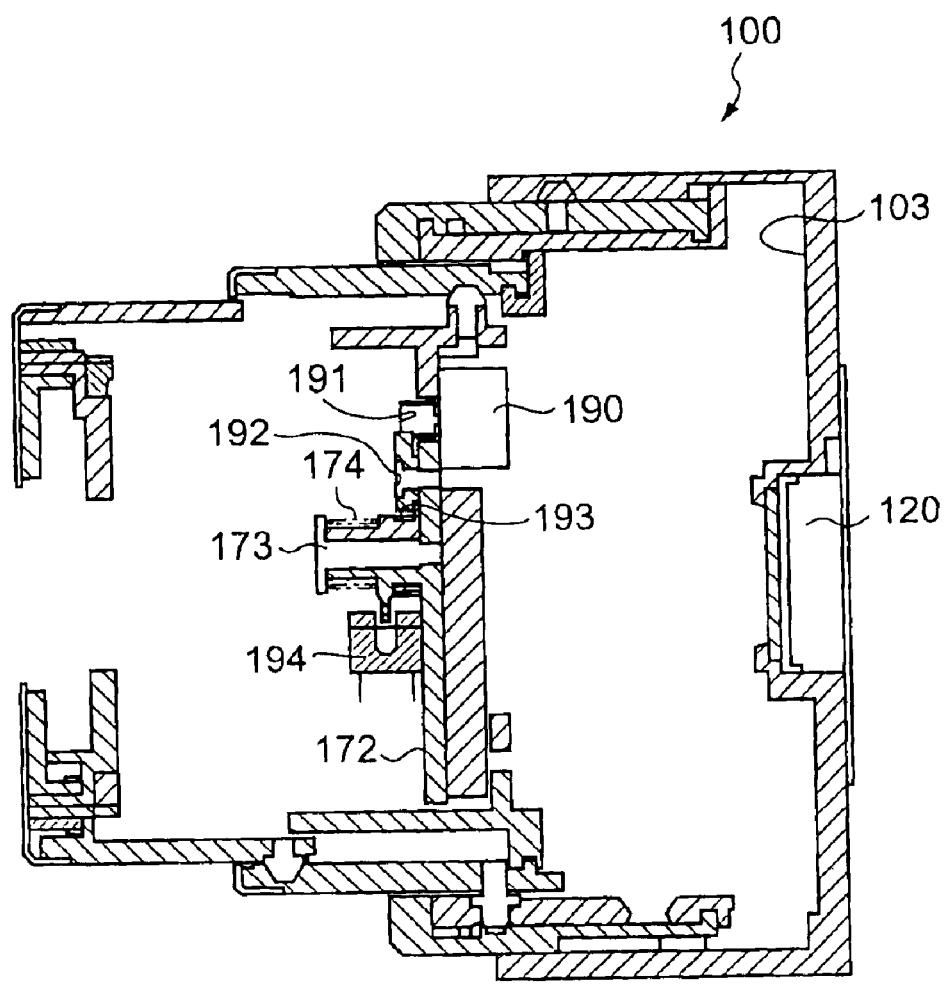
FIG. 10 is a sectional view taken along the line G–G' in FIG. 6.
Figure 11:
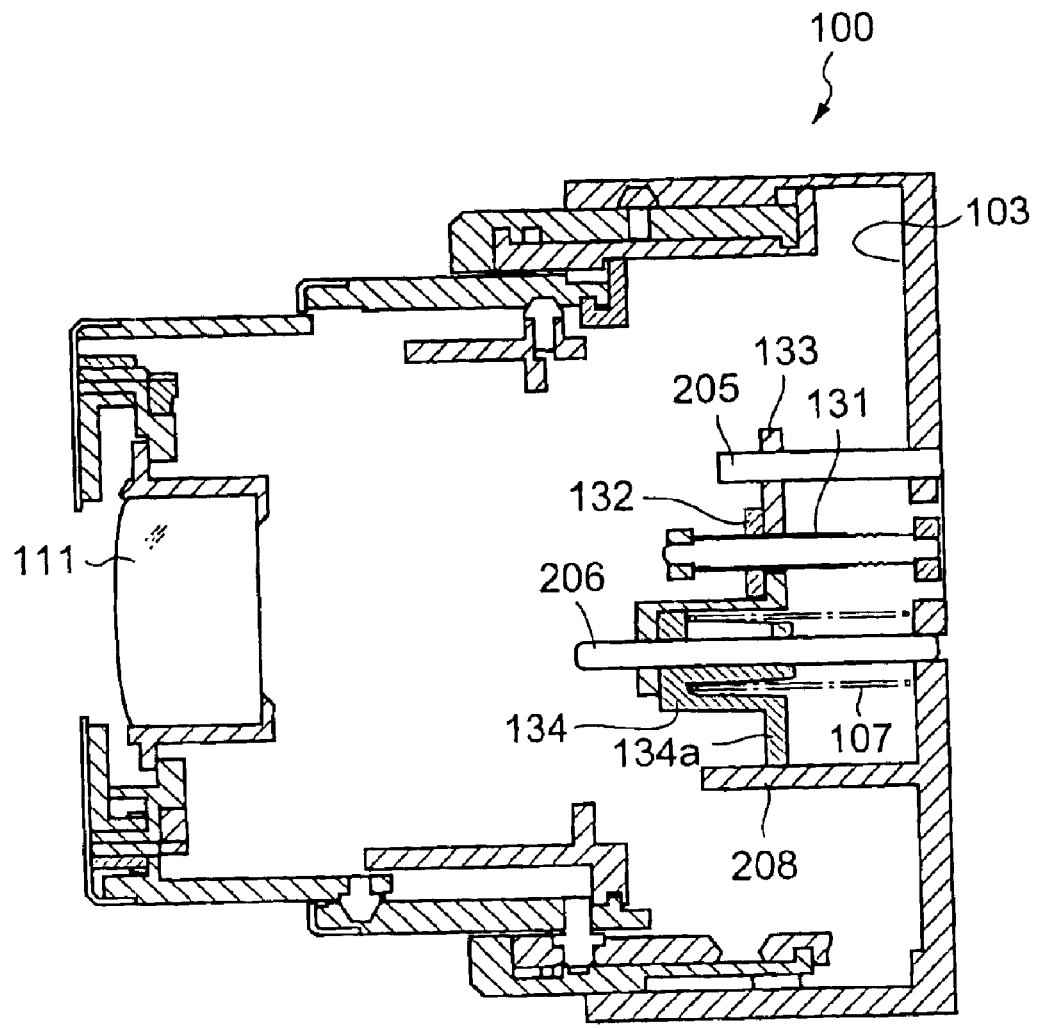
FIG. 11 is a sectional view showing essential parts of the wide-edge state taken along the line D–D' in FIG. 5.
Figure 12:
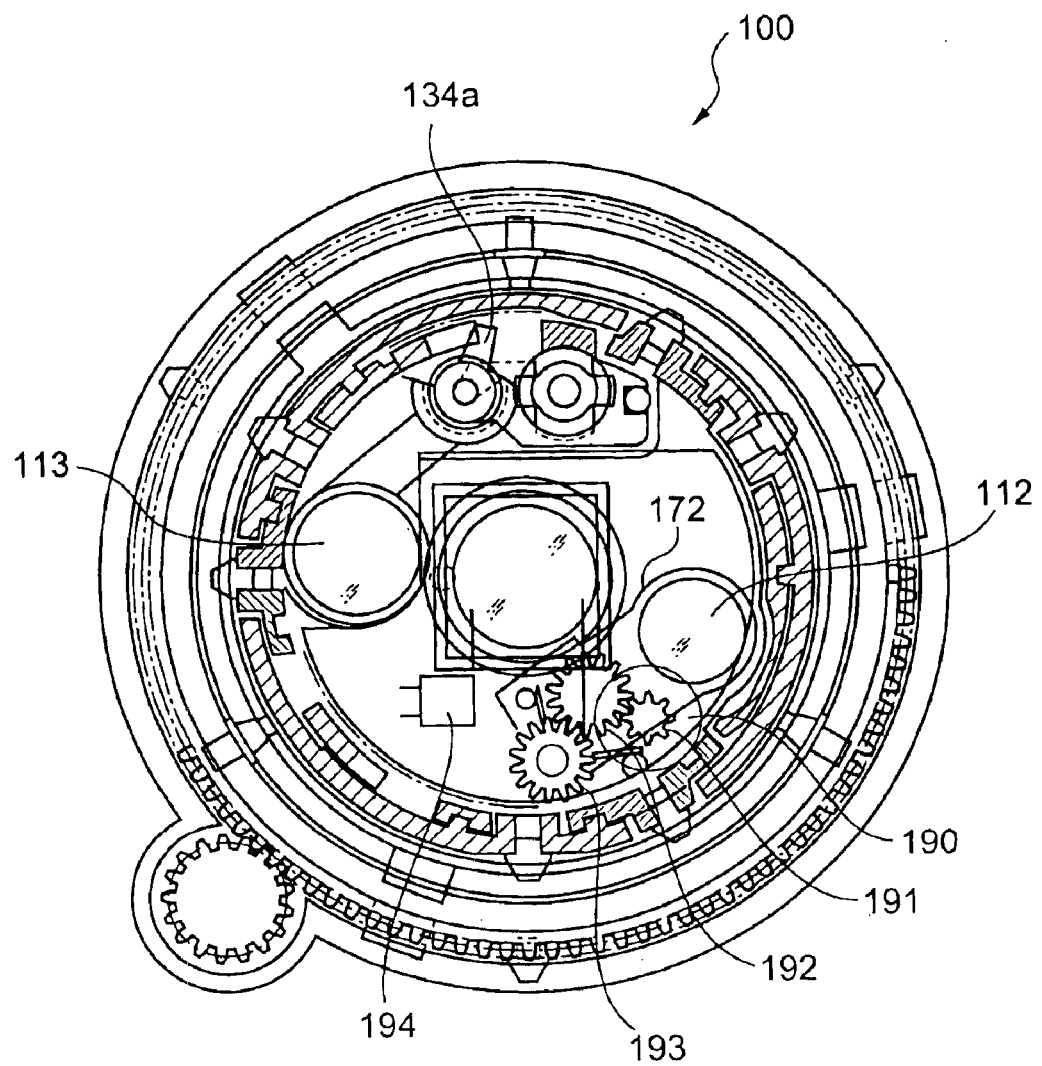
FIG. 12 is a schematic diagram showing the essential parts of the lens barrel in its retracted state of the digital camera of the first embodiment shown in FIGS. 1 to 11 as viewed from the optical axis direction.
Figure 13:
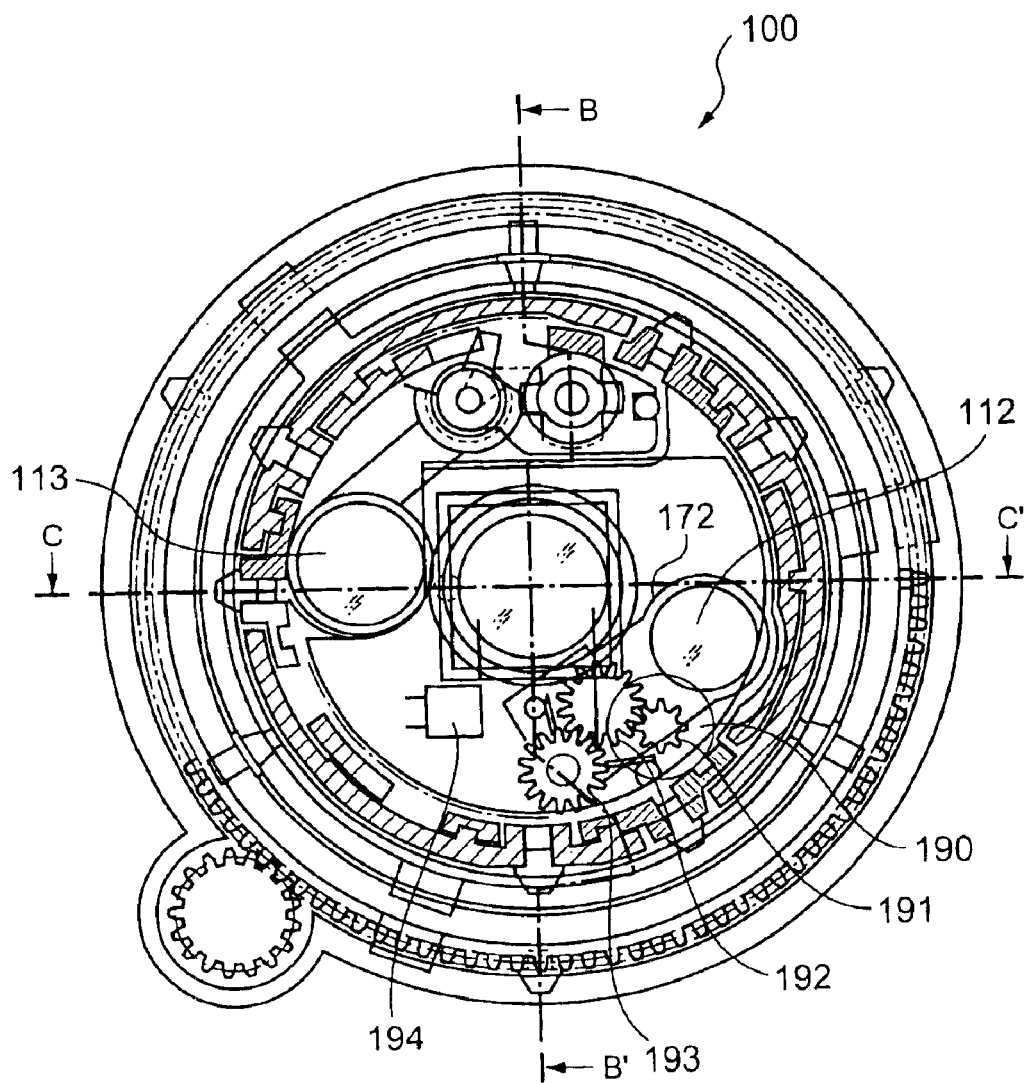
FIG. 13 is a sectional view that is the same as FIG. 12 but showing lines B–B' and C–C'.
Figure 14:
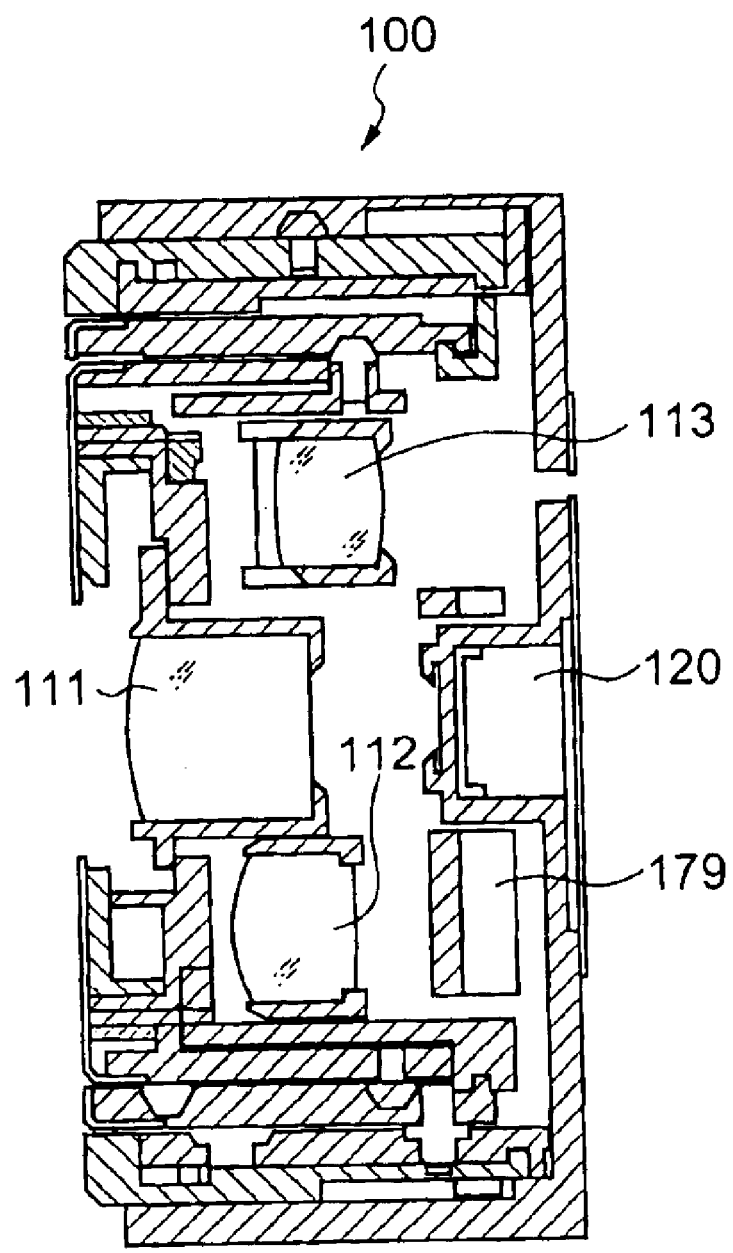
FIG. 14 is a sectional view taken along the line C–C' in FIG. 13.
Figure 15:
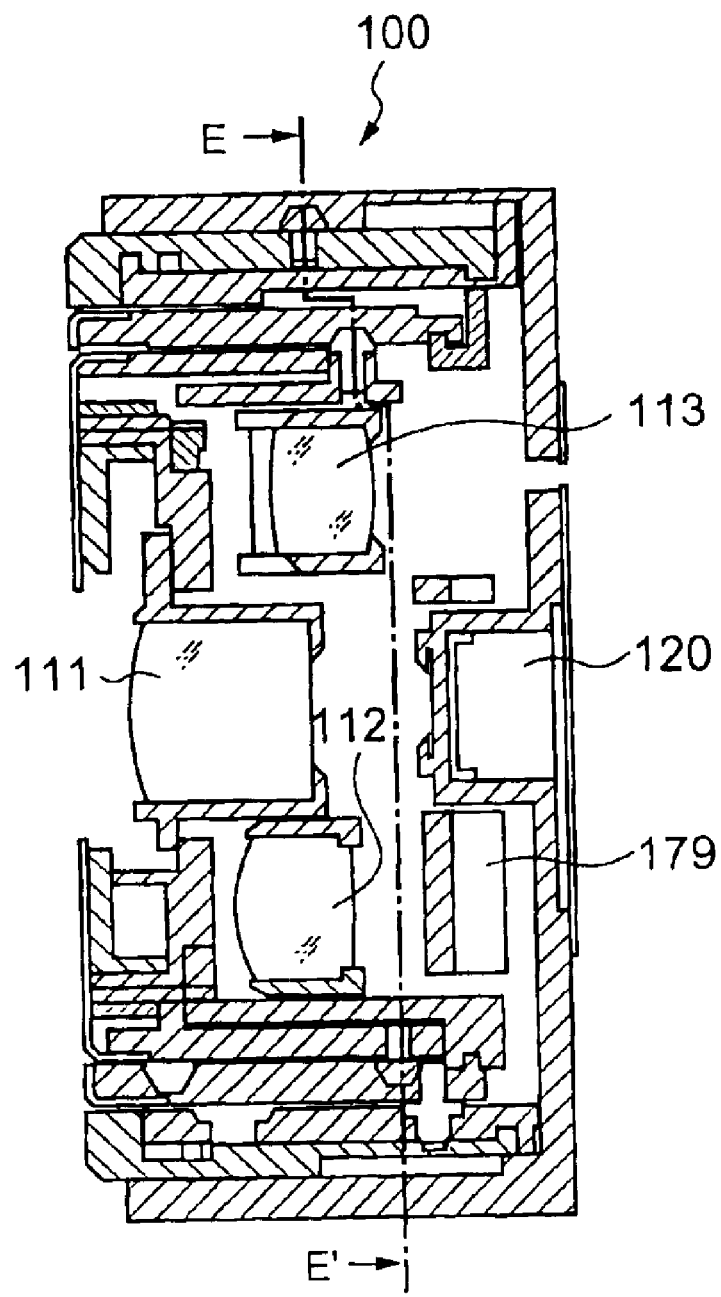
FIG. 15 is a sectional view that is the same as FIG. 14 but showing a line E–E'.
Figure 16:
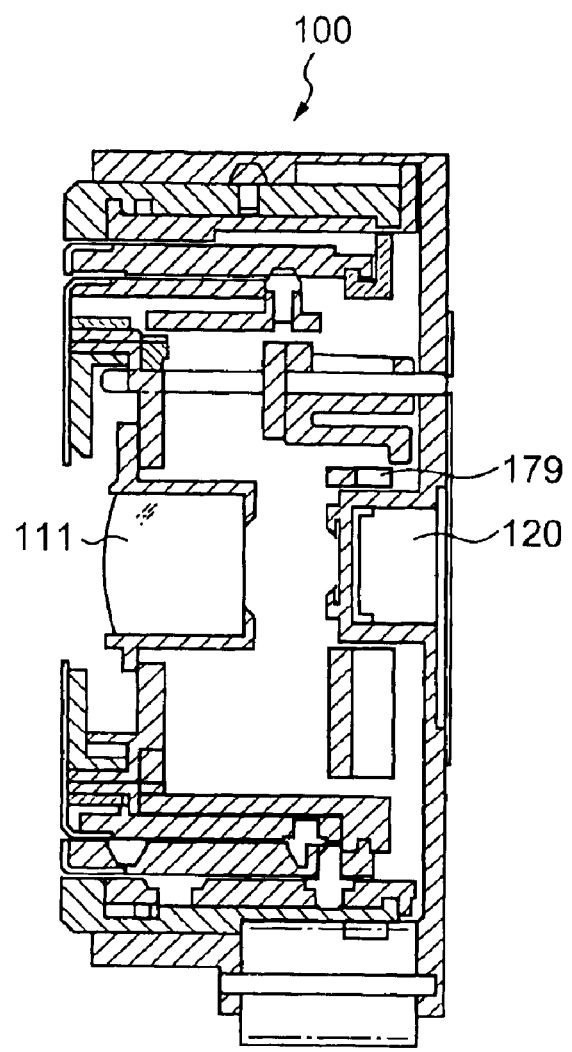
FIG. 16 is a sectional view taken along the line B–B' in FIG. 13.

FIG. 3 is a schematic diagram showing essential parts of a lens barrel in its advanced state of the digital camera of the first embodiment of the invention shown in FIGS. 1 and 2 as viewed from an optical axis direction, FIG. 4 is a sectional view that is the same as FIG. 3 but showing a line A–A', FIG. 5 is a sectional view that is the same as FIG. 3 but showing a line D–D', FIG. 6 is a sectional view that is the same as FIG. 3 but showing a line G–G'. FIG. 7 is a sectional view showing a state of tele-edge having the longest focal length taken along the line A–A' in FIG. 4, FIG. 8 is a sectional view that is the same as FIG. 7 but showing a line F–F' (a sectional view taken along the line F–F' is the diagram shown in FIG. 1), FIG. 9 is a sectional view showing a state of wide-edge having the shortest focal length taken along the line A–A' in FIG. 4, FIG. 10 is a sectional view taken along the line G–G' in FIG. 6, FIG. 11 is a sectional view showing essential parts of the wide-edge state taken along the line D–D' in FIG. 5, FIG. 12 is a schematic diagram showing the essential parts of the lens barrel in its retracted state of the digital camera of the first embodiment shown in FIGS. 1 to 11 as viewed from the optical axis direction, FIG. 13 is a sectional view that is the same as FIG. 12 but showing lines B–B' and C–C'; FIG. 14 is a sectional view taken along the line C–C' in FIG. 13, FIG. 15 is a sectional view that is the same as FIG. 14 but showing a line E–E' (a sectional view taken along the line E–E' is the diagram shown in FIG. 12), and FIG. 16 is a sectional view taken along the line B–B' in FIG. 13.

Referring to mainly FIG. 7, the present embodiment will be explained below.

In an internal space 101 of the lens barrel 100 shown in FIGS. 3 to 16, the shooting lens 110 having the front lens group 111, the rear lens group 112 and the focus lens 113 are accommodated. These groups are arranged in this order from forward in the optical axis direction. If the rear lens group 112 of the shooting lens 110 moves between a tele-edge shown in FIG. 7 and a wide-edge shown in FIG. 9, the focal length is changed, and if the focus lens 113 moves in the optical axis direction, the focus is adjusted.

A front end of the internal space is formed with an opening 102. The shooting lens 110 is formed in the opening 102. A wall member 103 fixed to the camera body or constituting a portion of the camera body is disposed in the rear portion of the internal space. The internal space 101 is defined by the wall member 103 and later-described cylindrical bodies.

Among the cylindrical bodies, a front group frame 180 has the smallest outer diameter and is disposed forefront side on the shooting optical axis when the lens barrel advances. The front lens group 111 is held inside the front group frame 180. Since the front lens group 111 has a smaller inner diameter than that of the front group frame 180, a space is formed beside the front lens group 111 between the front lens group 111 and the front group frame 180. In the following explanation, the space between the front lens group 111 and the front group frame 180 is called front lens group side 106.

A CCD image pickup element (CCD, hereinafter) 120 is mounted on the wall member 103 such that the CCD 120 projects into the internal space 101. Since the CCD 120 is disposed on a position where the CCD 120 projects into the internal space 101, a dent 104 is defined by the CCD 120 and the wall member 103.

A feed screw 131 (see FIG. 11) is rotatably supported by the wall member 103. A nut member 132 shown in FIG. 11 is threadedly engaged with the feed screw 131, and a focus lens guide frame 133 for guiding the focus lens 113 in the optical axis direction is fixed to the nut member 132. Since the focus lens guide frame 133 is fixed to the nut member 132 and a guide rod 205 projecting from the wall member 103 is fitted into a fork-like groove 133a (see FIG. 3) provided in the focus lens guide frame 133, the focus lens guide frame 133 moves in the optical axis direction by rotating the feed screw 131.

A focus lens holding frame 134 (see FIG. 11) for holding the focus lens 113 is fixed to the focus lens guide frame 133 such that the focus lens holding frame 134 can turn around a rotation shaft 206. The focus lens 113 is biased in a direction above the optical axis of the shooting lens 110 by a coil spring 107. The focus lens holding frame 134 turns in a range between a position where the focus lens 113 held by the focus lens holding frame 134 advances on the optical axis of the shooting lens 110 (see FIGS. 7 and 9) and a retracted state (see FIG. 14) where the focus lens 113 enters into the front lens group side 106. If the focus lens holding frame 134 turns, the focus lens 113 turns and is retracted into the retracted state which is set on the front lens group side 106. This mechanism will be explained later.

The feed screw 131 is threadedly engaged with the nut member 132 to which the focus lens guide frame 133 is fixed. The feed screw 131 is rotated by a focus motor (not shown) provided on the side of the camera body. If the feed screw 131 is rotated, the focus lens guide frame 133 fixed to the nut member 132 and the focus lens holding frame 134 fixed to the focus lens guide frame 133 move in the optical axis direction. In this way, the focus lens guide frame 133 held by the focus lens holding frame 134 moves in the optical axis direction, and the position of the focus lens 113 is adjusted such that a subject image having good focus is displayed on the front surface of the CCD 120.

As shown in FIG. 7, a fixed cylinder 140 is fixed to the wall member 103. A rotation cylinder 150 is provided inside the fixed cylinder 140. The rotation cylinder 150 is provided at its outer periphery with a gear 151 which meshes with a columnar gear 105 (see FIG. 3). The columnar gear 105 is rotated by a lens barrel driving motor (not shown). With this, the rotation cylinder 150 is turned. The fixed cylinder 140 is formed at its inner wall with a cam groove 141. A cam pin 152 fixed to the rotation cylinder 150 is fitted into the cam groove 141. Thus, if the rotation cylinder 150 receives the rotation force through the columnar gear 105, the rotation cylinder 150 advances or retreats in the optical axis direction while rotating.

A rotation cylinder-side straight advancing key ring 154 is provided inside the rotation cylinder 150. The rotation cylinder-side straight advancing key ring 154 can relatively rotate with respect to the rotation cylinder 150, but can not move in the optical axis direction with respect to the rotation cylinder 150. A key plate 155 is fixed to the rotation cylinder-side straight advancing key ring 154. The key plate 155 is fitted into the key groove 142 formed in an inner wall of the fixed cylinder 140 such as to advance in the optical axis direction. With this configuration, the rotation cylinder-side straight advancing key ring 154 can move in the optical axis direction but can not rotate with respect to the fixed cylinder 140. Therefore, if the rotation cylinder 150 moves in the optical axis direction while rotating, since the rotation cylinder-side straight advancing key ring 154 is prevented from rotating with respect to the fixed cylinder 140, the key ring does not rotate, but moves in the optical axis direction together with the rotation cylinder 150.

A rotatable intermediate cylinder 160 is provided inside the rotation cylinder 150. A cam groove 156 is formed in an inner wall of the rotation cylinder 150. A cam groove 157 is formed in the rotation cylinder-side straight advancing key ring 154 such that the cam groove 157 passes through the outer periphery and inner periphery of the rotation cylinder 150. A cam pin 161 provided on the intermediate cylinder 160 is fitted into the cam groove 156 of the rotation cylinder 150 such that the cam pin 161 passes through the cam groove 157 of the rotation cylinder-side straight advancing key ring 154. Thus, if the rotation cylinder 150 moves in the optical axis direction while rotating, the intermediate cylinder 160 also rotates while following shapes of the cam grooves 156 and 157 of the rotation cylinder 150 and the rotation cylinder-side straight advancing key ring 154, and the intermediate cylinder 160 further moves in the optical axis direction with respect to the rotation cylinder 150.

An intermediate cylinder-side straight advancing key ring 164 is disposed inside the intermediate cylinder 160. The fixed cylinder-side straight advancing key ring 154 is formed with a straight advancing key groove 158. The intermediate cylinder-side straight advancing key ring 164 is fitted into a straight advancing key groove 158 of the fixed cylinder-side straight advancing key ring 154. The intermediate cylinder-side straight advancing key ring 164 can relatively rotate with respect to the intermediate cylinder 160, but can not move in the optical axis direction with respect to the intermediate cylinder 160. Thus, if the intermediate cylinder 160 moves in the optical axis direction with respect to the rotation cylinder 150 while rotating, the intermediate cylinder-side straight advancing key ring 164 does not rotate and straightly moves in the optical axis direction as the intermediate cylinder 160 moves in the optical axis direction.

A cam groove 165 for guiding a rear group lens guide frame 170 is formed in an inner wall of the intermediate cylinder 160. A cam pin 171 fixed to the rear group lens guide frame 170 is fitted into the cam groove 165 in a state in which the cam pin 171 is prevented from rotating with respect to the intermediate cylinder-side straight advancing key ring 164. Thus, if the intermediate cylinder 160 rotates, the rear group lens guide frame 170 straightly moves in the optical axis direction in accordance with the shape of the cam groove 165 of the inner wall of the intermediate cylinder 160.

An aperture unit 179 is fixed to the rear group lens guide frame 170 rearward in the optical axis direction. The aperture unit 179 includes a spring which biases the aperture to open the same, and includes an actuator which controls the aperture against the spring biasing force. When the lens barrel is retracted, the aperture is opened by the actuator, and even if the power supply is turned off, the aperture remains in its opened state by the spring biasing force. A rear lens group holding frame 172, which is provided forward in the optical axis direction and holds the rear lens group 112, is pivotally supported by a rotation shaft 173 of the rear group lens guide frame 170 such that the rear lens group holding frame 172 can turn around the rear group lens guide frame 170. The rear lens group holding frame 172 turns between a using position (see FIGS. 7 and 9) where the rear lens group 112 held by the rear lens group holding frame 172 advances to the optical axis of the shooting lens 110 and a retracted state (see FIG. 14) where the lens group 112 retracts into a part of the front lens group side 106, which is different from a part of the front lens group side 106 into which the focus lens retracts. The coil spring 174 is provided around the rotation shaft 173. The rear lens group holding frame 172 is biased by the coil spring 174 in a direction where the rear lens group 112 turns on the shooting optical axis of the shooting lens 110. The rear lens group holding frame 172 is also biased in the optical axis direction. A lens shutter unit 135 is mounted on the focus lens holding frame 134 forward in the optical axis direction.

A mechanism in which the rear lens group holding frame 172 turns, thereby turning the rear lens group 112 and retracting the same to the front lens group side 106 will be explained later.

The intermediate cylinder 160 is formed with another cam groove 166 for guiding the front group lens frame 180 which holds the front lens group 111. A cam pin 181 provided on the front group lens frame 180 enters into the cam groove 166. The front group lens frame 180 is prevented by the intermediate cylinder-side straight advancing key ring 164 from rotating such that the front group lens frame 180 can move in the optical axis direction. Thus, if the intermediate cylinder 160 rotates, the front group lens frame 180 straightly moves in the optical axis direction with respect to the intermediate cylinder 160 in accordance with the shape of the cam groove 166.

With this mechanism, when the rotating force is transmitted to the rotation cylinder 150 in the retracting direction through the columnar gear 105 at the tele-edge shown in FIG. 7, the lens barrel retracts from the state of tele-edge shown in FIG. 7 to the state shown in FIGS. 14 and 16 through the state of wide-edge shown in FIG. 9. On the other hand, if the rotation force is transmitted to the rotation cylinder 150 in the advancing direction in the retracted state shown in FIGS. 14 and 16, the lens barrel advances from the retracted state shown in FIGS. 14 and 16 to the state of wide-edge shown in FIG. 9 and further to the state of tele-edge shown in FIG. 7.

In the digital camera 1 of this embodiment, when the lens barrel is retracted, the focus lens 113 and the rear lens group 112 retract from the optical axis. The aperture unit 179 located between the rear lens group 112 and the focus lens 113 has such an opening diameter that the CCD 120 can be accommodated in the opening. FIGS. 14, 15 and 16 show the CCD 120 accommodated in the opening of the aperture unit 179.

When a picture is to be taken, the zoom operation switch is operated to adjust the focal length between the tele-edge shown in FIG. 7 and the wide-edge shown in FIG. 9, thereby setting the shooting angle of view to a desired value. The focus of the focus lens 113 is adjusted to a position where the best contrast can be obtained by detecting the contrast based on the image signal obtained by the CCD 120. Then, if the shutter button is pushed, an image signal indicating the current subject is generated by the CCD 120, appropriate image processing is carried out and then, it is stored.

A mechanism for turning the focus lens 113 into the retracted state set in the front lens group side 106 when the lens barrel is retracted will be explained.

As described above, the focus lens holding frame 134 which holds the focus lens 113 is rotatably supported on the focus lens guide frame 133 by the rotation shaft 206, and the focus lens 113 is biased in a direction where the focus lens 113 is located on the optical axis of the shooting lens 110 by the coil spring 107 (see FIG. 11).

As shown in FIG. 11, a projection 208 projecting into the internal space 101 is formed on the wall member 103 which defines a rear surface of the internal space 101 of the lens barrel 100 within a retracting direction moving locus of an engaging section 134a of the focus lens holding frame 134.

Figure 17:
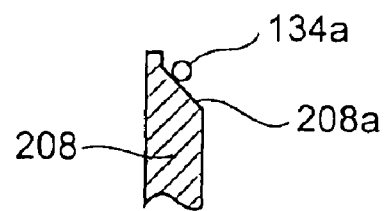
FIG. 17 is a schematic diagram of an engaging section of a projection and a focus lens holding member provided on a wall member as viewed from a direction different from the direction shown in FIG. 11 through 90°.

FIG. 17 is a schematic diagram of the projection provided on the wall member and the engaging section of the focus lens holding member as viewed from a direction which is different from the direction shown in FIG. 11 through 90°.

As shown in FIG. 17, the projection 208 of the wall member 103 is provided with a tapered surface 208a which engages with the engaging section 134a of the focus lens holding frame 134. Thus, if the feed screw 131 (see FIG. 11) rotates and the focus lens 113 approaches the CCD 120, and the engaging section 134a of the focus lens holding frame 134 comes into contact with the tapered surface 208a of the projection 208 and moves along the tapered surface 208a. With this, the focus lens holding frame 134 turns around the rotation shaft 206, and the focus lens 113 held by the focus lens holding frame 134 turns while deviating from the optical axis of the shooting lens 110 and moves into the retracted state (see FIG. 14) set in the front lens group side 106.

If the lens barrel 100 moves from the retracted state shown in FIGS. 14 to 16 to the advancing direction, the engagement between the focus lens holding frame 134 and the projection 208 projecting from the wall member 103 is released, and the focus lens holding frame 134 turns from the state shown in FIG. 12 to a state shown in FIG. 3 by the biasing force of the coil spring 107 (see FIG. 11). With this, the focus lens 113 turns from the front lens group side 106 which is the retracted state shown in FIG. 14 to the position on the optical axis.

A mechanism for turning the rear lens group 112 into the retracted state set in the front lens group side 106 when the lens barrel is retracted will be explained.

The rear lens group holding frame 172 which holds the rear lens group 112 is rotatably supported on the rear group lens guide frame 170 by the rotation shaft 173, and is biased, by the coil spring 174, in a direction where the rear lens group 112 is located on the optical axis of the shooting lens 110. A stepping motor 190 (see FIG. 10) is mounted on the rear group lens guide frame 170. The stepping motor 190 has a rotation shaft to which a driving gear 191 is fixed. As shown in FIG. 3 or 10, a receiving gear 193 is fixed to the rear lens group holding frame 172. A rotation force of the stepping motor 190 is transmitted to the transmitting gear 192 shown in FIG. 3 or 10, the rotation force of the stepping motor 190 transmitted to the transmitting gear 192 is further transmitted to the receiving gear 193 fixed to the rear lens group holding frame 172. FIGS. 3 and the like show a photo-interrupter 194 which detects that the rear lens group holding frame 172 exists on the optical axis. In this embodiment, if the lens barrel 100 starts retracting, the stepping motor 190 rotates at a predetermined timing and with this, the rear lens group holding frame 172 also turns around the rotation shaft 173, and the rear lens group 112 retracts from the optical axis into the retracted state which is deviated from the optical axis as shown in FIG. 12. This retracted state is the front lens group side 106 formed beside the front lens group.

If the lens barrel 100 moves in the advancing direction from the retracted state shown in FIGS. 14 to 16, the stepping motor 190 rotates in the opposite direction from that when the lens barrel is retracted. Thus, the rear lens group holding frame 172 turns from the state shown in FIG. 12 to the state shown in FIG. 3, and the rear lens group 112 turns to the position on the optical axis from the retracted state shown in FIG. 14.

In the first embodiment, both the focus lens 113 and the rear lens group 112 retract into the front lens group side 106 when the lens barrel is retracted. In the case of the conventional digital camera having the retracting and advancing mechanism in which the front lens group side 106 does not have a mechanism for retracting the shooting lens 110 from the optical axis and the lens barrel retracts while leaving the shooting lens 110 on the optical axis, the front lens group side 106 is prone to be a waste space. In this embodiment, however, since both the focus lens 113 and the rear lens group 112 are deviated from the optical axis and retracted into the front lens group side 106 when the lens barrel is retracted, the front lens group side 106 is used effectively and the CCD 120 can be accommodated in the opening of the aperture unit 179 and thus, the digital camera can further be reduced in thickness when the lens barrel is retracted.

Figure 18:
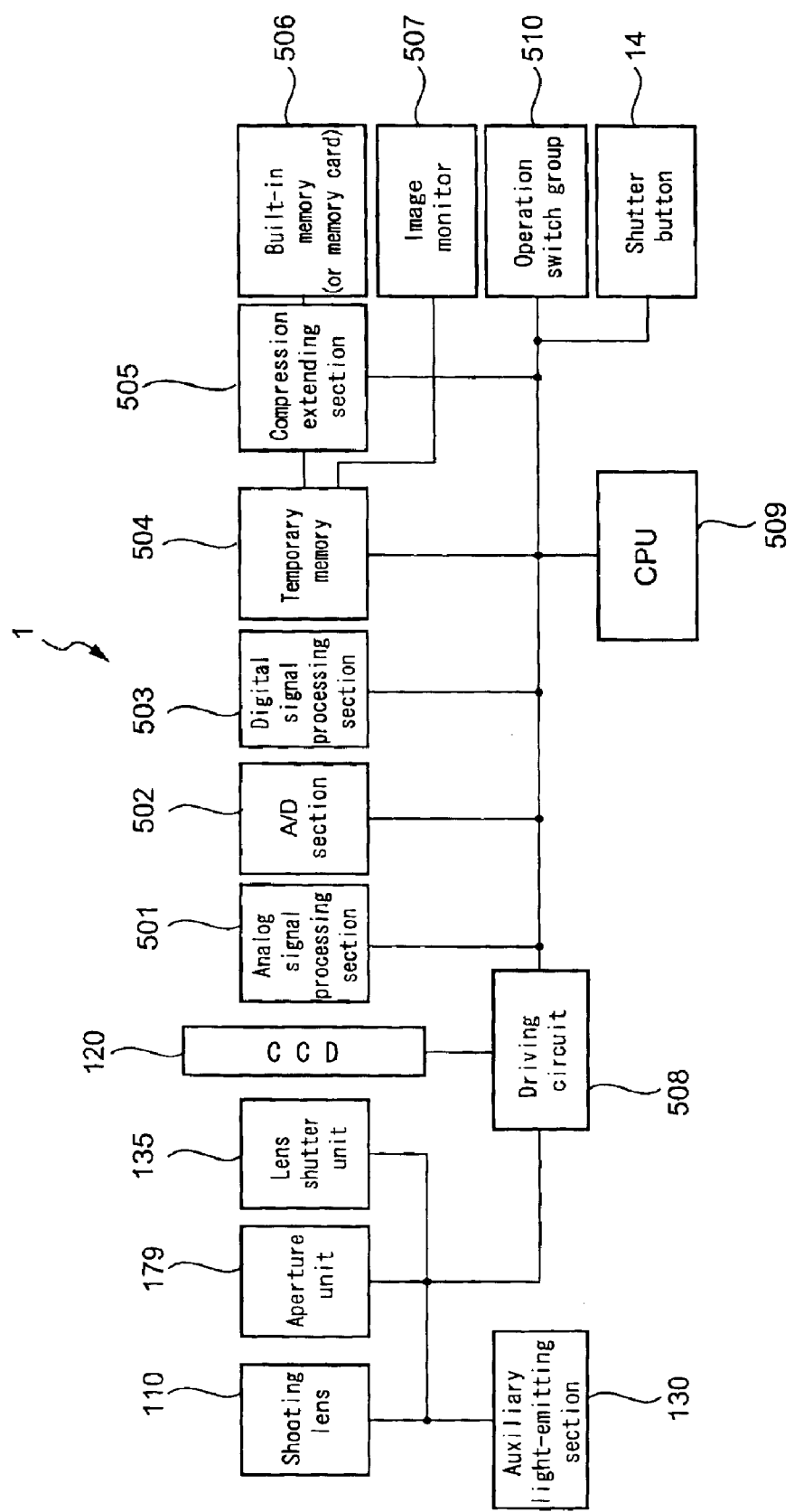
FIG. 18 is a block diagram showing a circuit configuration of the digital camera shown in FIGS. 1 to 16.

FIG. 18 is a block diagram showing a circuit configuration of the digital camera shown in FIGS. 1 to 16.

The digital camera 1 includes the shooting lens 110, the aperture unit 179, the lens shutter unit 135 and the CCD 120. A subject image formed on the CCD 120 through the shooting lens 110 and the aperture unit 179 is converted into an analog image signal. The lens shutter unit 135 mounted on the focus lens holding frame 134 restrains smear from being generated by light when the analog signal is read from the CCD 120.

The digital camera 1 also includes an auxiliary light-emitting section 130. The auxiliary light-emitting section 130 emits auxiliary light when illumination is low. The auxiliary light-emitting section 130 can also emit light if necessary even when illumination is not low.

The digital camera 1 includes an analog signal processing section 501, an A/D section 502, a digital signal processing section 503, a temporary memory 504, a compression extending section 505, a built-in memory (or memory card) 506, the image monitor 507, and a driving circuit 508. The CCD 120 is driven with timing generated by a timing generating circuit (not shown) in the driving circuit 508 and outputs an analog image signal. The driving circuit 508 also includes a driving circuit which drives the shooting lens 110, the aperture unit 179, the lens shutter unit 135, the auxiliary light-emitting section 130 and the like. The analog image signal which is output from the CCD 120 is subjected to the analog signal processing by the analog signal processing section 501, and A/D converted by the A/D section 502 and is subjected to the digital signal processing by the digital signal processing section 503. Data indicative of signal which was subjected to the digital signal processing is temporarily stored in the temporary memory 504. The data stored in the temporary memory 504 is compressed by the compression extending section 505, and is stored in the built-in memory (or memory card) 506. Depending upon the shooting mode, the data may directly be stored in the built-in memory 506 without compressing the data. The data stored in the temporary memory 504 is read by the image monitor 507 and the subject image is displayed on the image monitor 507.

The digital camera 1 further includes a CPU 509 which controls the entire digital camera 1, an operation switch group 510 including the zoom operation switch, and the shutter button 14. The operation switch group 510 is operated to obtain a desired shooting state including a desired angle of view, and if the shutter button 14 is pushed, a picture can be taken.

In the present embodiment, both the rear lens group 112 and the focus lens 113 retract into the front lens group side 106, but the invention is not limited to this. Both of them may retract into the dent 104 beside the CCD 120. Alternatively, one of the three lens groups including the front lens group, or the front lens group 111 and one of the rear lens group 112 and the focus lens 113, or all of the three lens groups may retract into one of or both of the front lens group side 106 and the dent 104.

Nest, a second embodiment will be explained.

Figure 19:
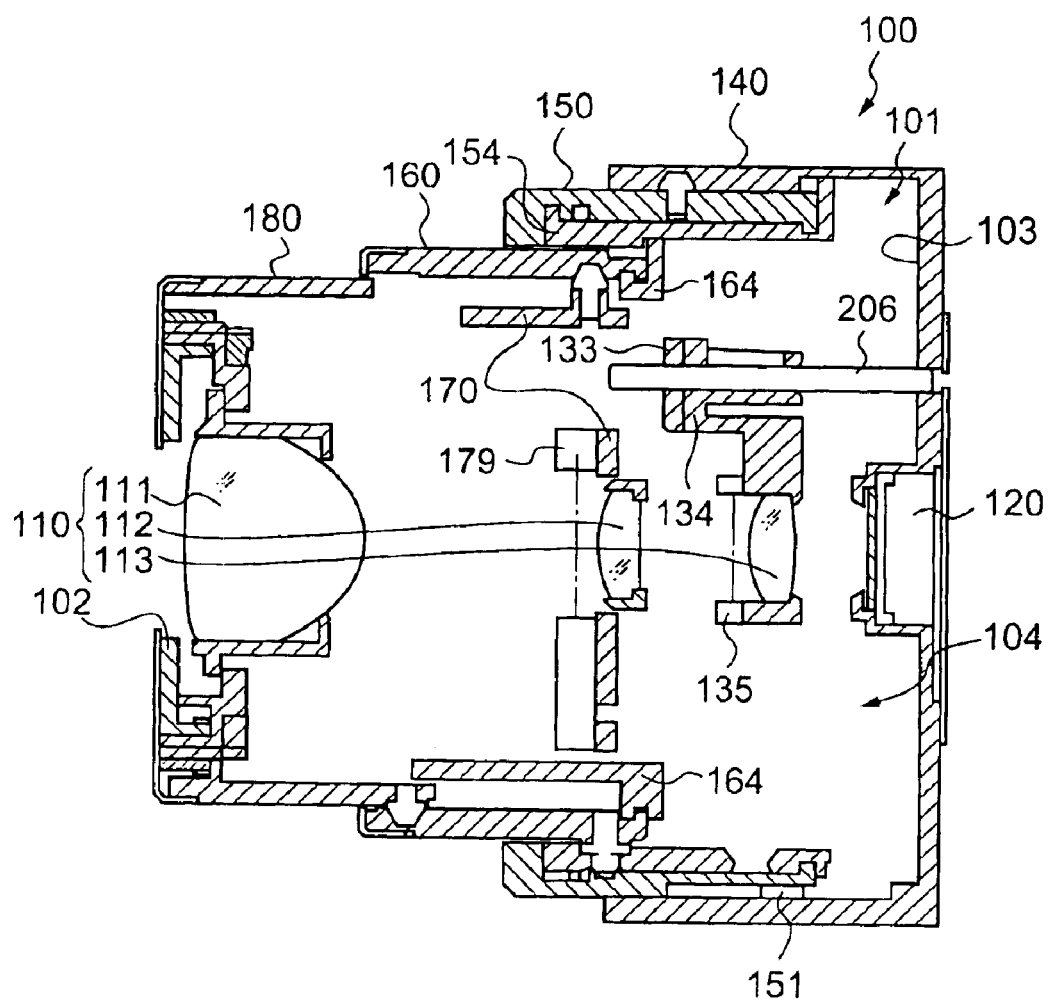
FIG. 19 is a sectional view of a second embodiment.

FIG. 19 is a sectional view of this embodiment. The outward appearance of this embodiment is the same as that of the first embodiment and thus, illustration thereof is omitted. In the following description, the same elements as those shown in FIGS. 1 to 18 are designated with the same reference symbols, and only a different portion of the operation mechanisms will be explained.

FIG. 19 shows a lens barrel of the digital camera having the shooting lens 110 including the three groups as in the first embodiment. The second embodiment is different from the first embodiment in that although the aperture unit 179 is mounted to the rear surface of the rear group lens guide frame 170 in the optical axis direction in the first embodiment, the aperture unit 179 is mounted on a front surface of the rear group lens guide frame 170 in the optical axis direction in the second embodiment, in that only the focus lens 113 among the three groups retracts from the optical axis when the lens barrel 100 is retracted, and in that the retracted state is the dent 104 beside the CCD 120.

Figure 20:
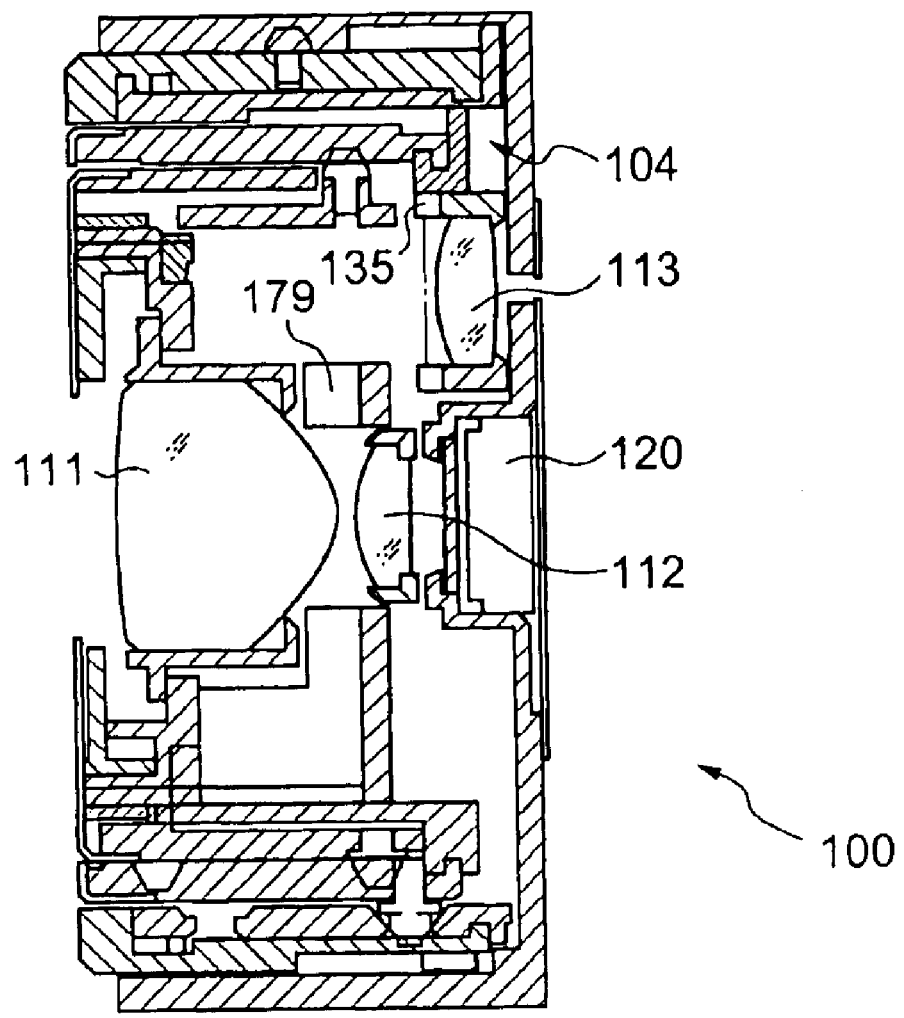
FIG. 20 is a sectional view of the second embodiment.

FIG. 20 is also a sectional view of this embodiment.

FIG. 20 corresponds to FIG. 14 showing the first embodiment, and shows a state in which a rear end of the front lens group 111 enters into the opening of the aperture unit 179 which is opened by retracting the lens barrel 100.

In the second embodiment, the focus lens 113 is retracted into the dent 104 of the CCD 120 when the lens barrel 100 is retracted. In the case of the conventional digital camera having the retracting and advancing mechanism in which the dent 104 does not have a mechanism for retracting the shooting lens 110 from the optical axis and the lens barrel retracts while leaving the shooting lens 110 on the optical axis, the dent 104 is prone to be a waste space. In this embodiment, however, since the focus lens 113 is deviated from the optical axis and retracted into the dent 104 when the lens barrel is retracted, the dent 104 is used effectively and the rear end of the front lens group Ill can be accommodated in the opening of the aperture unit 179 and thus, the digital camera can further be reduced in thickness when the lens barrel is retracted.

Although only the focus lens 113 is retracted into the dent 104 in this embodiment, the present invention is not limited to this, and only the focus lens 113 may be retracted into the front lens group side 106. Alternatively, one of the one lens group of the three lens groups including the front lens group, or the front lens group 111 and one of the rear lens group 112 and the focus lens 113 may be retracted, or the rear lens group 112 and one of the front lens group 111 and the focus lens 113 may be retracted, or all of the three lens groups may be retracted to one of or both of the front lens group side 106 and the dent 104.

A third embodiment will be explained.

Figure 21:
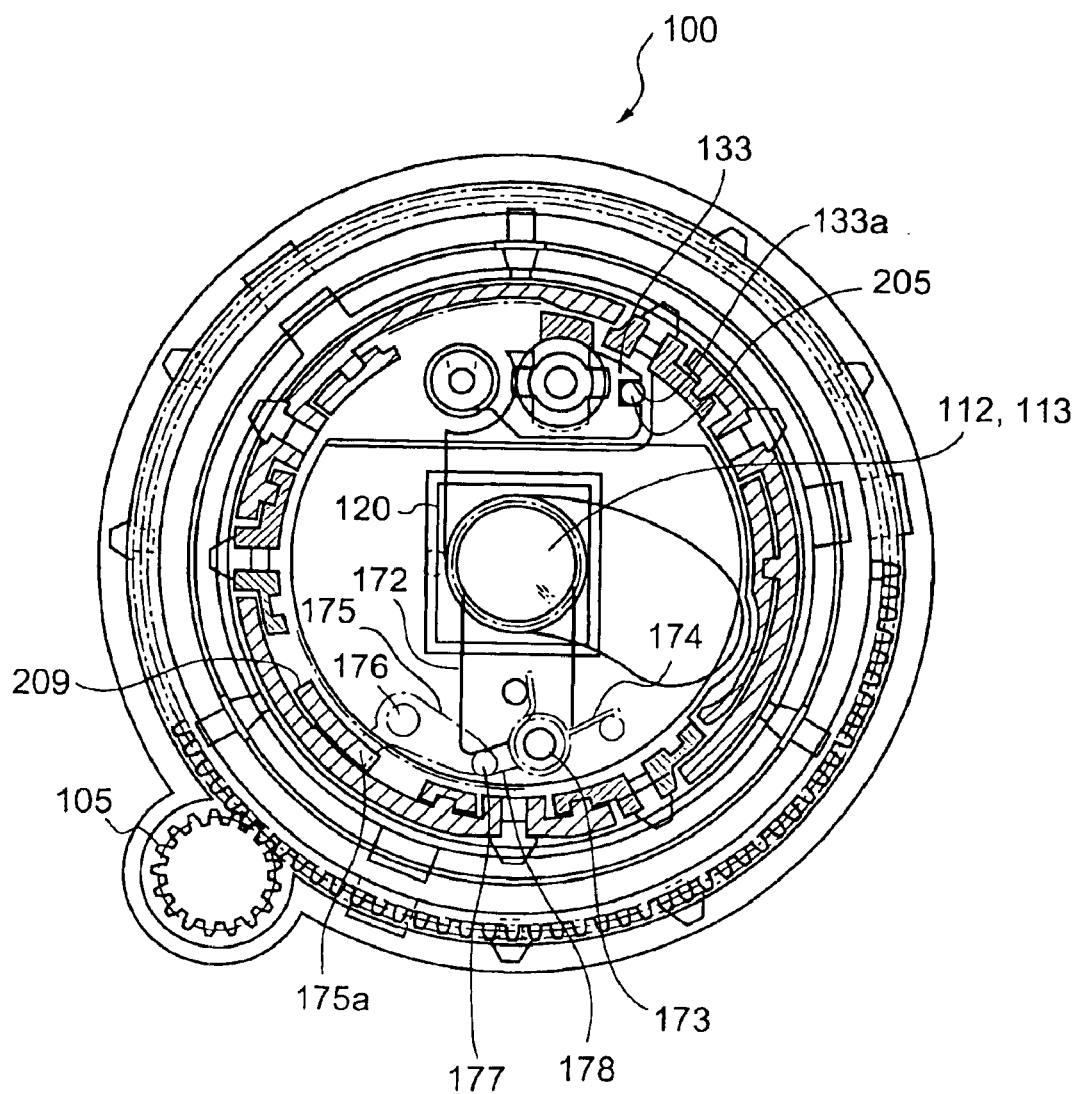
FIG. 21 is a schematic diagram showing essential parts of a lens barrel in its advanced state of a digital camera of a third embodiment of the invention as viewed from the optical axis direction.
Figure 22:
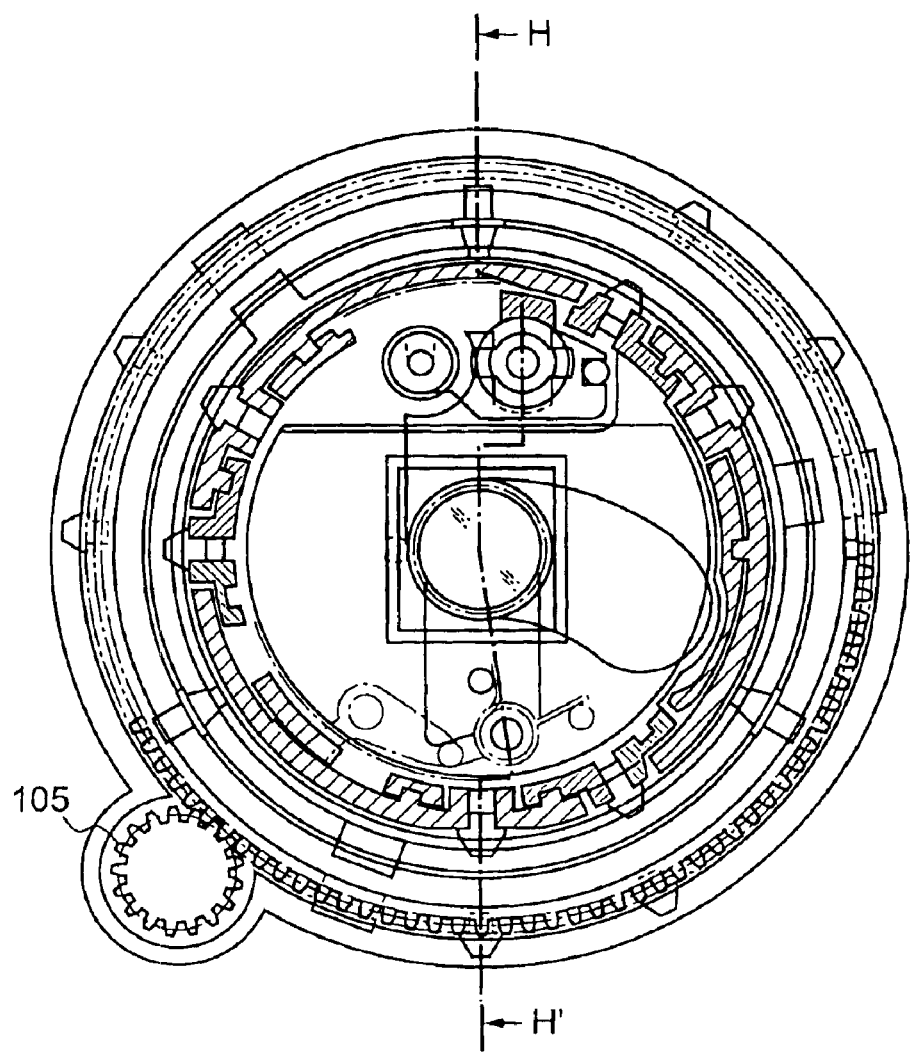
FIG. 22 is a sectional view that is the same as FIG. 21 but showing a line H–H'.
Figure 23:
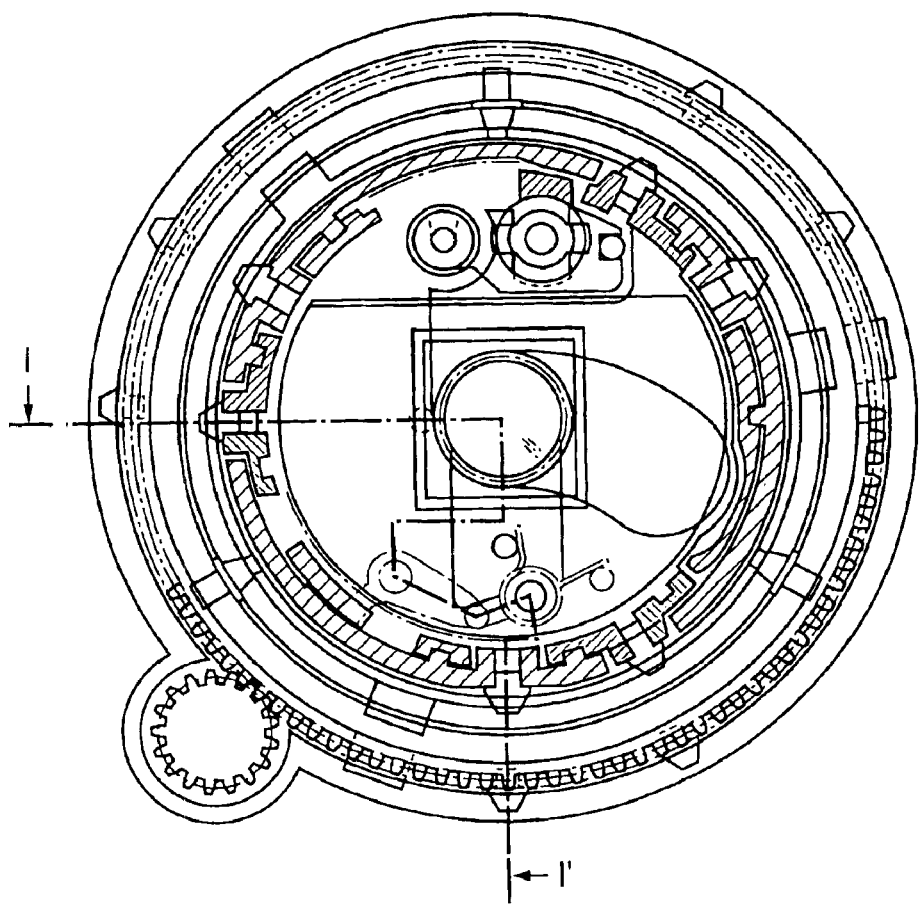
FIG. 23 is a sectional view that is the same as FIG. 21 but showing a line I–I' and corresponds to FIG. 6 showing the first embodiment.
Figure 24:
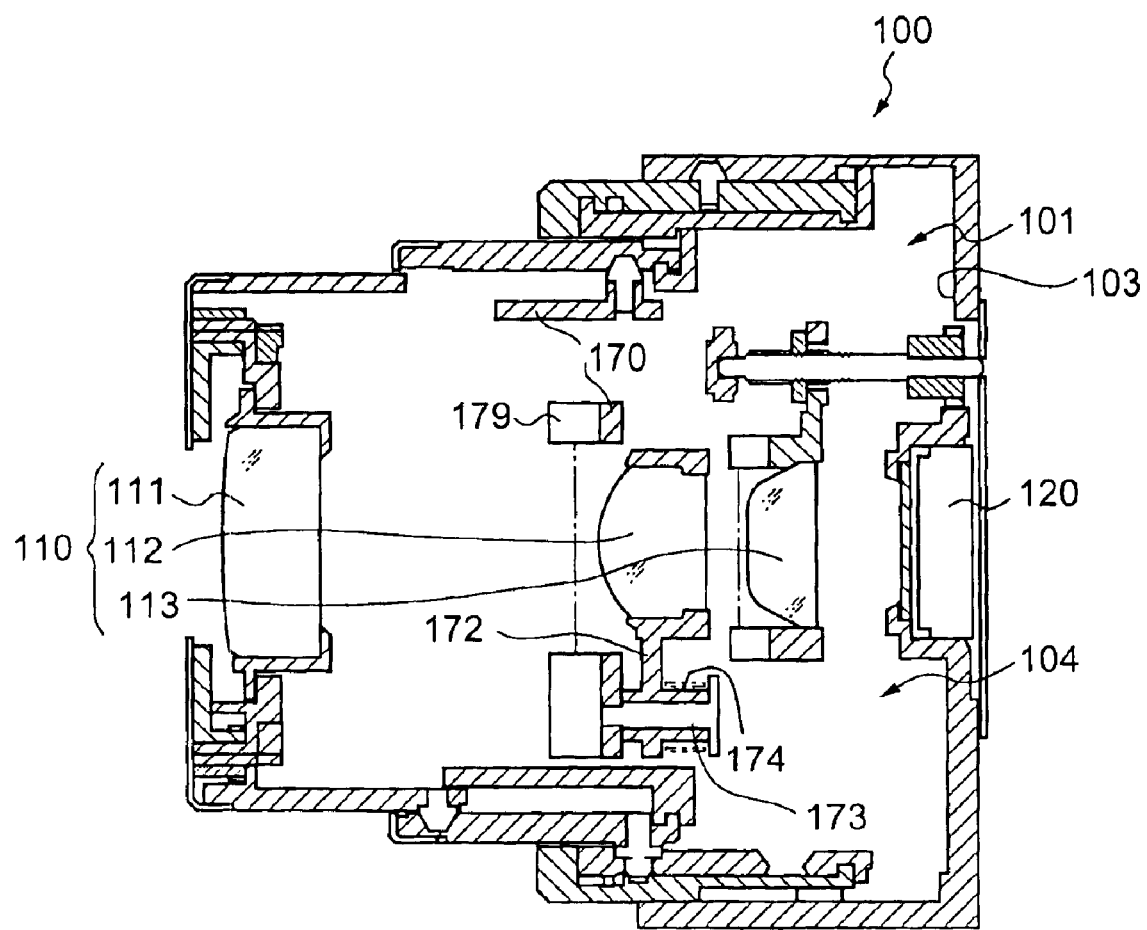
FIG. 24 is a sectional view taken along the line H–H' in FIG. 22 showing a state of wide-edge having the shortest focal length.
Figure 25:
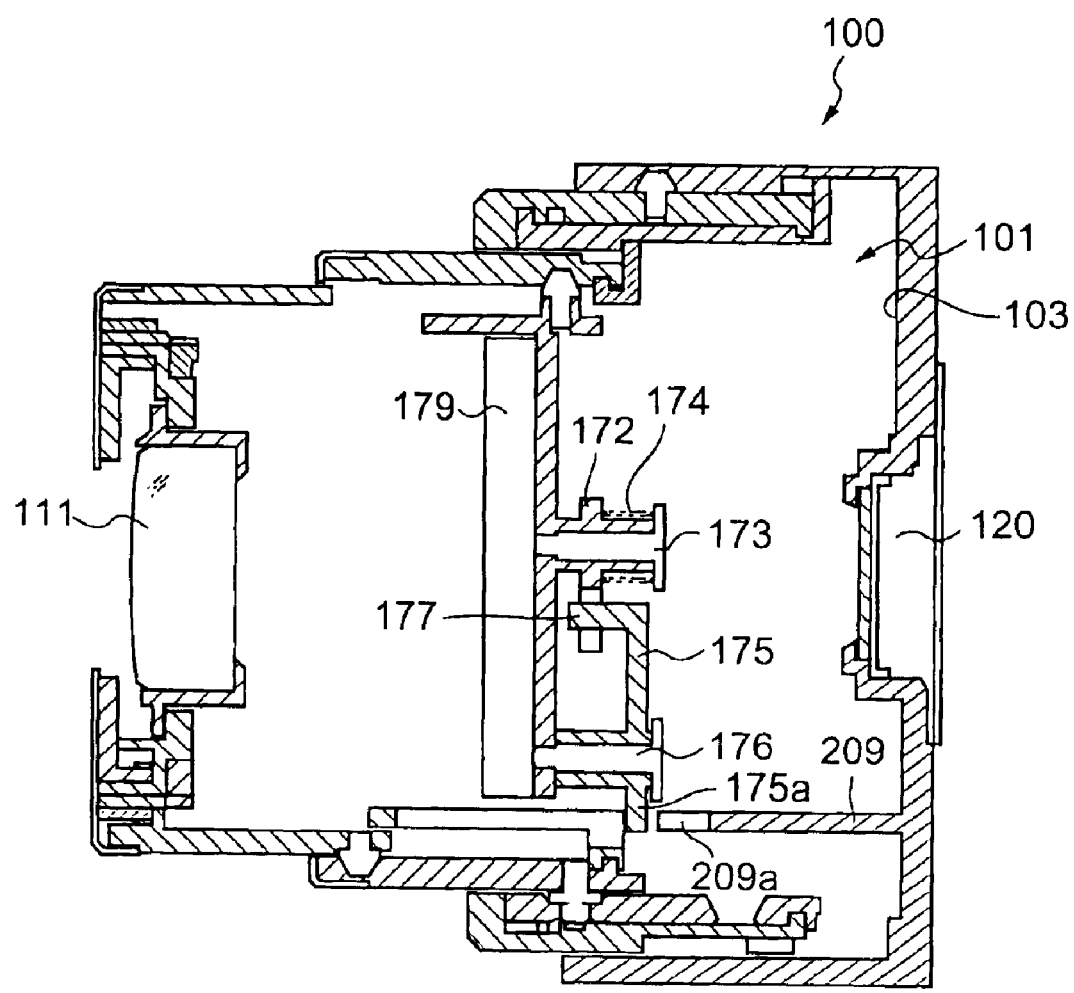
FIG. 25 is a sectional view taken along the line I–I' in FIG. 23.
Figure 26:
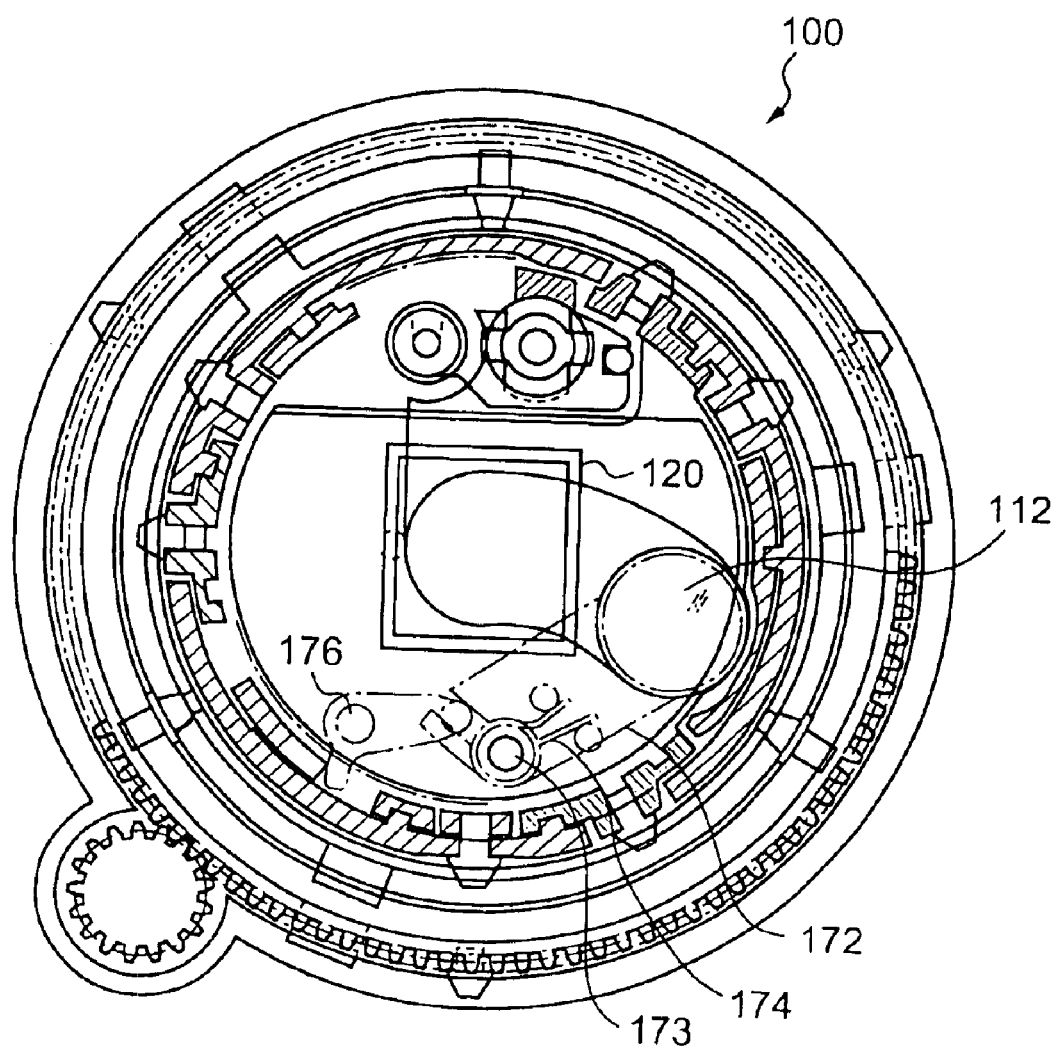
FIG. 26 is a schematic diagram showing essential parts of the lens barrel in its retracted state of the digital camera of the third embodiment shown FIGS. 21 to 25 as viewed from the optical axis direction.
Figure 27:
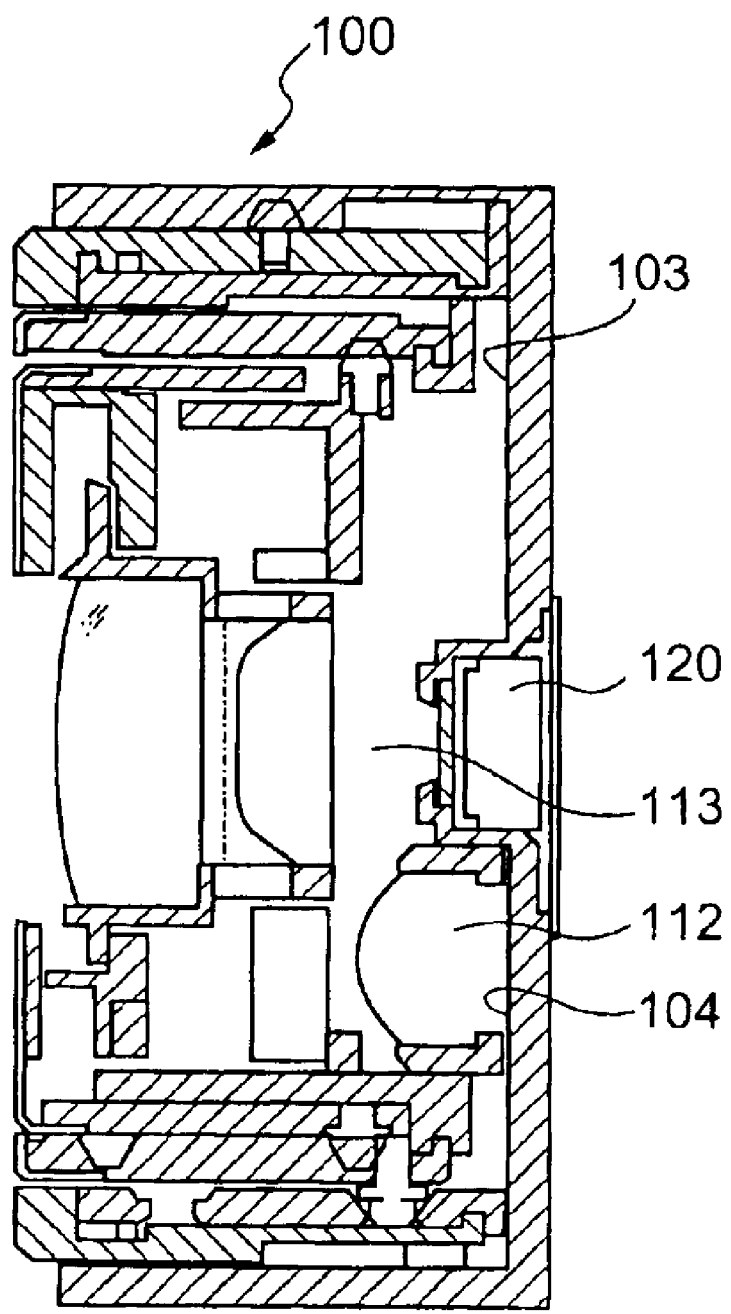
FIG. 27 is a sectional view of the third embodiment when the lens barrel is retracted.

FIG. 21 is a schematic diagram showing essential parts of a lens barrel in its advanced state of a digital camera of a third embodiment of the invention as viewed from the optical axis direction and corresponds to FIG. 3 showing the first embodiment, FIG. 22 is a sectional view that is the same as FIG. 21 but showing a line H–H' and corresponds to FIG. 4 showing the first embodiment, FIG. 23 is a sectional view that is the same as FIG. 21 but showing a line I–I' and corresponds to FIG. 6 showing the first embodiment. FIG. 24 is a sectional view taken along the line H–H' in FIG. 22 showing a state of wide-edge having the shortest focal length and corresponds to FIG. 9 showing the first embodiment, FIG. 25 is a sectional view taken along the line I–I' in FIG. 23 and corresponds to FIG. 10 showing the first embodiment. Also, FIG. 26 is a schematic diagram showing essential parts of the lens barrel in its retracted state of the digital camera of the third embodiment of the invention as viewed from the optical axis direction and corresponds to FIG. 12 showing the first embodiment. FIG. 27 is a sectional view of the third embodiment when the lens barrel is retracted and corresponds to FIG. 14 showing the first embodiment.

The third embodiment is different from the first embodiment only in that only the rear lens group 112 retracts from the optical axis, the rear lens group 112 retracts into the dent 104 beside the CCD 120 and in that the aperture unit 179 is mounted on the front surface of the rear group lens guide frame 170 in the optical axis direction (see FIG. 24). With reference to FIG. 24 mainly, a mechanism for retracting the rear lens group 112 into the dent 104 beside the CCD 120 when the lens barrel is retracted, and a mechanism for advancing the rear lens group 112 onto the optical axis from the retracted state will be explained.

The mechanism for turning the rear lens group 112 into the retracted state is similar to the mechanism for turning the focus lens 113 into the retracted state explained in the first embodiment.

The rear lens group holding frame 172 which holds the rear lens group 112 is rotatably supported on the rear group lens guide frame 170 by the rotation shaft 173. The rear lens group 112 is biased by the coil spring 174 in a direction where the rear lens group 112 is located on the optical axis of the shooting lens 110. The lever member 175 shown in FIG. 21 and the like is also rotatably supported by the rotation shaft 176 on the rear group lens guide frame 170. A fork-like engaging groove 178 as shown in FIG. 21 is provided in the rear lens group holding frame 172. An engaging pin 177 provided on one end of the lever member 175 enters into the engaging groove 178.

As shown in FIG. 25, a projection 209 projects into the internal space 101 from the wall member 103 which defines a rear surface of the internal space 101. The projection 209 projects in the moving locus in the retracting direction of an end 175a of the lever member 175 opposite from the engaging pin 177. A tapered surface 209a is provided on a tip end of the projection 209. Thus, if the rotation cylinder 150 rotates in the retracting direction, the intermediate cylinder 160 and the rear group lens guide frame 170 which is engaged with the intermediate cylinder 160 through the cam also move in the retracting direction, the end 175a of the lever member 175 abuts against the tapered surface 209a of the projection 209 and moves along the tapered surface 209a. With this, the lever member 175 turns from a rotating position shown in FIG. 22 to a rotation position shown in FIG. 26. Since the engaging pin 177 of the lever member 175 enters into the fork-like engaging groove 178 of the rear lens group holding frame 172, the rear lens group holding frame 172 also turns around the rotation shaft 173, thereby retracting the rear lens group 112 from a position on the shooting optical axis shown in FIG. 21 to the dent 104 beside the CCD 120 out from the optical axis shown in FIG. 26.

If the lens barrel 100 moves from the advanced state shown in FIG. 27 in the advancing direction, the engagement between the lever member 175 and the projection 209 projecting from the wall member 103 shown in FIG. 25 is released. The rear lens group holding frame 172 is biased by the coil spring 174 shown in FIG. 25 and turns from the state shown in FIG. 26 to the state shown in FIG. 22. With this, the rear lens group 112 turns from the retracted state shown in FIG. 27 to the position on the shooting optical axis.

In the third embodiment, only the rear lens group 112 is deviated from the optical axis and retracted into the dent 104 when the lens barrel is retracted. Thus, the dent 104 is effectively used, and the focus lens 113 can be accommodated in the opening of the aperture unit 179. Therefore, the digital camera can further be reduced in thickness as compared with the conventional technique.

Although only the rear lens group 112 is retracted into the dent 104 in this embodiment, the present invention is not limited to this, and only the rear lens group 112 may be retracted into the front lens group side 106. Alternatively, one of the one lens group of the three lens groups including the front lens group, or the front lens group 111 and one of the rear lens group 112 and the focus lens 113 may be retracted, or the rear lens group 112 and one of the front lens group 111 and the focus lens 113 may be retracted, or all of the three lens groups may be retracted to one of or both of the front lens group side 106 and the dent 104.

A fourth embodiment will be explained.

Figure 28:
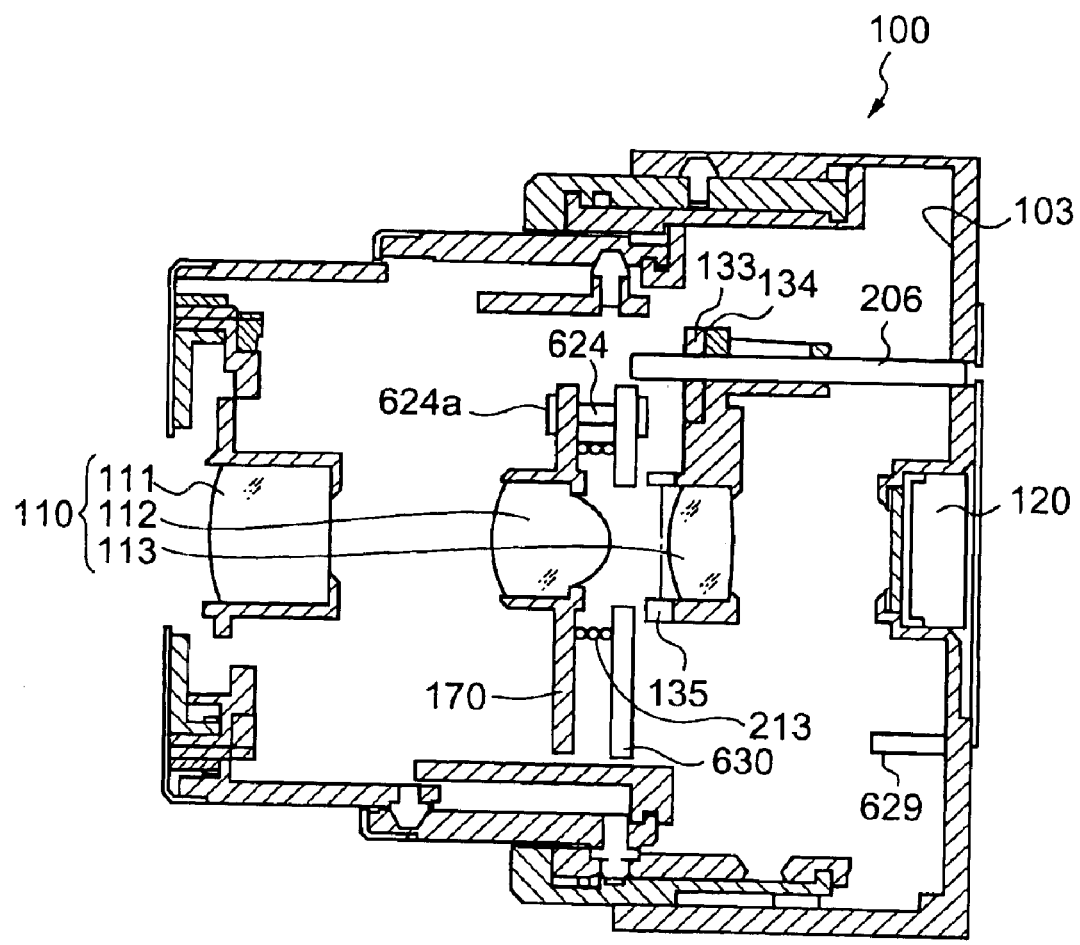
FIG. 28 is a sectional view of a fourth embodiment.

FIG. 28 is a sectional view of the fourth-embodiment.

FIG. 28 is the sectional view of the embodiment corresponding to FIG. 9 of the first embodiment. The fourth embodiment is different from the first embodiment in that the aperture unit 179 is fixed to the rear group lens guide frame 170 in the first embodiment, but an aperture unit 630 is mounted to the rear group lens guide frame 170 through a coil spring 213, and a rear end of the rear lens group 112 can be accommodated in an opening of the aperture unit 630 when the lens barrel is retracted, in that only the focus lens 113 of the three lens groups is retracted when the lens barrel is retracted, and in that the retracted state is not the front lens group side 106 but is the dent 104 beside the CCD 120.

The aperture unit 630 shown in FIG. 28 includes a guide rod 624 projecting from a back surface of the aperture unit 630 in the optical axis direction. The guide rod 624 slidably passes through the rear group lens guide frame 170 in the optical axis direction in front of the aperture unit 630. A stopper 624a is provided on a front end of the guide rod 624. The coil spring 213 is compressed between the aperture unit 630 and the rear group lens guide frame 170. With this configuration, the aperture unit 630 is held such that the aperture unit 630 can move in the optical axis direction in a state in which the aperture unit 630 is biased rearward with respect to the rear lens group unit including the rear lens group 112 and the guide frame 170. When the lens barrel is retracted, the rear lens group unit moves toward the aperture unit 630 while compressing the coil spring 213 by the rear lens group unit. With this configuration, a rear end of the rear lens group 112 can be accommodated in an opening of the aperture unit 630 when the lens barrel is retracted.

Figure 29:
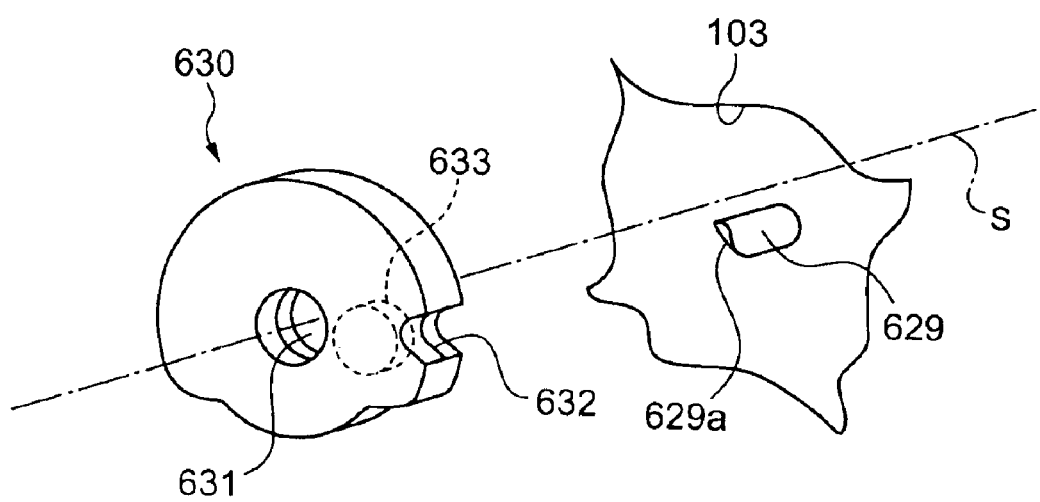
FIG. 29 is a schematic perspective view of the aperture unit.

FIG. 29 is a schematic perspective view showing the aperture unit.

The digital camera of this embodiment includes an engaging rod 629 (rod-like forcibly retracting member) extending from the wall member 103 shown in FIG. 28 toward the aperture unit 630 in the optical axis direction.

The aperture unit 630 includes a circular opening 631 formed around the optical axis S. The opening 631 is opened to such a size that the rear end of the rear lens group 112 located closer to a front surface of the opening 631 can enter in the opening 631 when the lens barrel is retracted. The aperture unit 630 includes a notch 632 on an extension line of the engaging rod 629. The engaging rod 629 provided on the wall member 103 can enter in the notch 632 when the lens barrel is retracted.

The aperture unit 630 includes an actuator 633 which turns an aperture blade 634 (see FIG. 30) around the rotation shaft.

Figure 30:
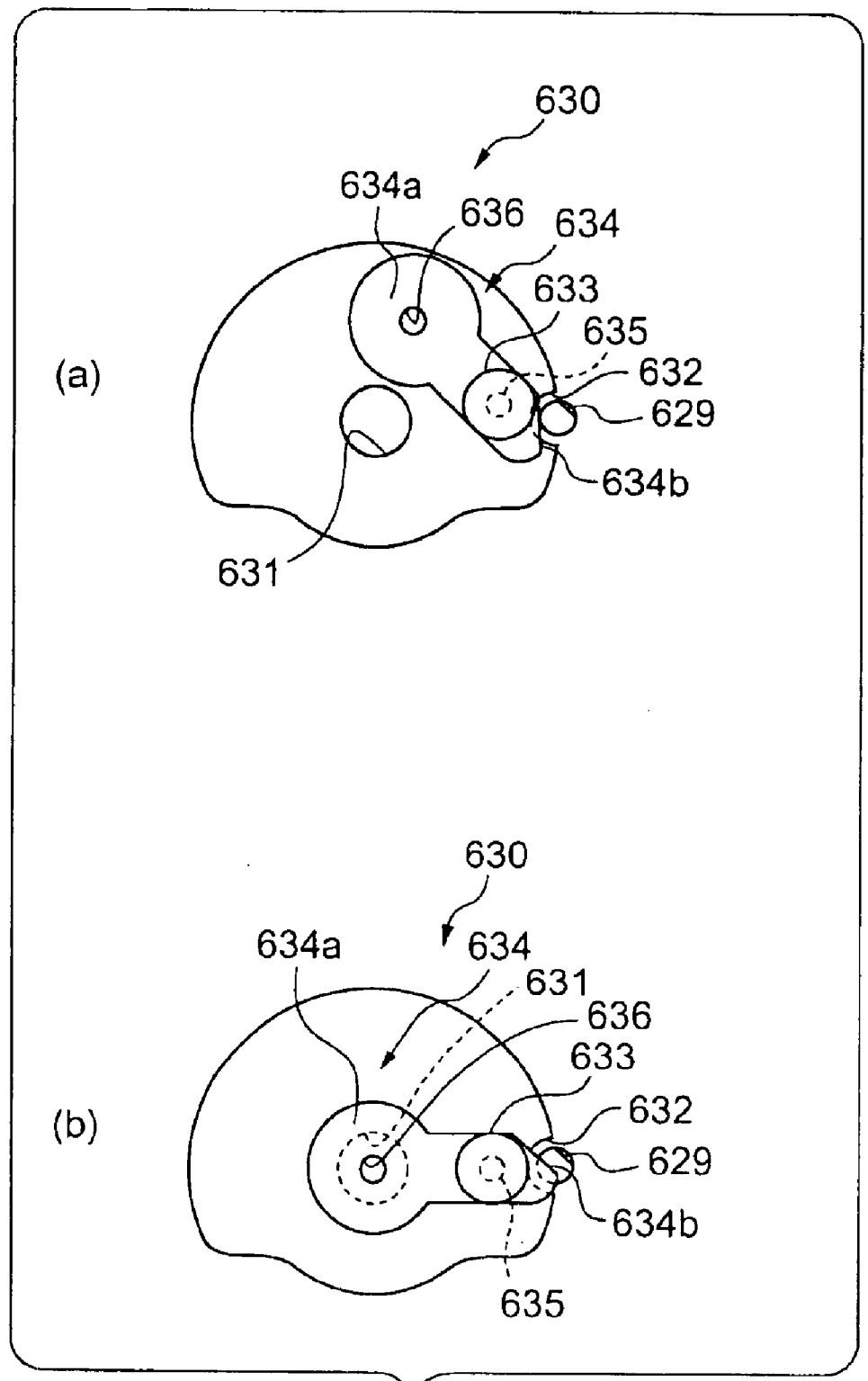
FIG. 30 is a schematic diagram showing one example of a structure of an aperture blade of an aperture unit and operation thereof.

FIG. 30 is a schematic diagram showing one example of a structure of the aperture blade of the aperture unit and operation thereof. The aperture blade 634 can turn around a driving shaft 635 of the actuator 633 between an opened position, i.e., the retracted state shown in part (a) of FIG. 30 and a small aperture position, i.e., non-retracted state shown in part (b) of FIG. 30.

The driving shaft 635 of the actuator 633 is biased by a spring such as to move the aperture blade 634 to the non-retracted state shown in part (b) of FIG. 30. If the driving shaft 635 is energized, the driving shaft 635 moves the aperture blade 634 to the opened position shown in part (a) of FIG. 30, and if the energization is stopped, the driving shaft 635 again moves the aperture blade 634 to the non-retracted state shown in part (b) of FIG. 30.

A plate 634a is provided on one side of the shaft 635 of the aperture blade 634. The plate 634a has such a size that the aperture blade 634 retracts beside the opening 631 of the aperture unit 630 but does not interfere with the opening 631 at the time of opening, and the plate 634a can close the opening 631 in the small aperture position (non-retracted state). A small hole 636 is formed in a central portion of the plate 634a. Light can pass through the small hole 636.

When the lens barrel 100 is in its advanced state (see FIG. 28), the aperture unit 630 is in a using state in which an amount of shooting light passing through the shooting lens 100 is controlled. In this using state, when the field is relatively dark, the aperture blade 634 moves in the opened position retracted beside the opening 631 as shown in part (a) of FIG. 30, and when the field is relatively bright, the aperture blade 634 moves to the small aperture position (non-retracted state) which is superposed on the opening 631. When the lens barrel 100 is retracted (see FIG. 31), the aperture unit 630 is in the retracted state where the aperture blade 634 remains in the opened position (retracted state).

A cam section 634b is provided on a side of the aperture blade 634 opposite from the plate 634a with respect to the shaft 635. The cam section 634b does not interfere with the notch 632 of the aperture unit 630 at the time of opening but moves to a position superposed on the notch 632 at the time of small aperture, and interfere with the engaging rod 629 entering into the notch 632 when the lens barrel is retracted.

As shown in FIG. 29, the engaging rod 629 is provided at its tip end with a tapered section 629a. The engaging rod 629 enters into the notch 632 when the lens barrel is retracted and the tapered section 629a pushes the cam section 634b of the aperture blade 634 which is in the small aperture position. Then, the cam section 634b turns to the opened position (retracted state) shown in part (a) of FIG. 30 against the spring biasing force toward the small aperture position shown in part (b) of FIG. 30 of the driving shaft 635 of the actuator 633. The rear lens group 112 enters into the opening 631 which is opened in this manner.

Figure 31:
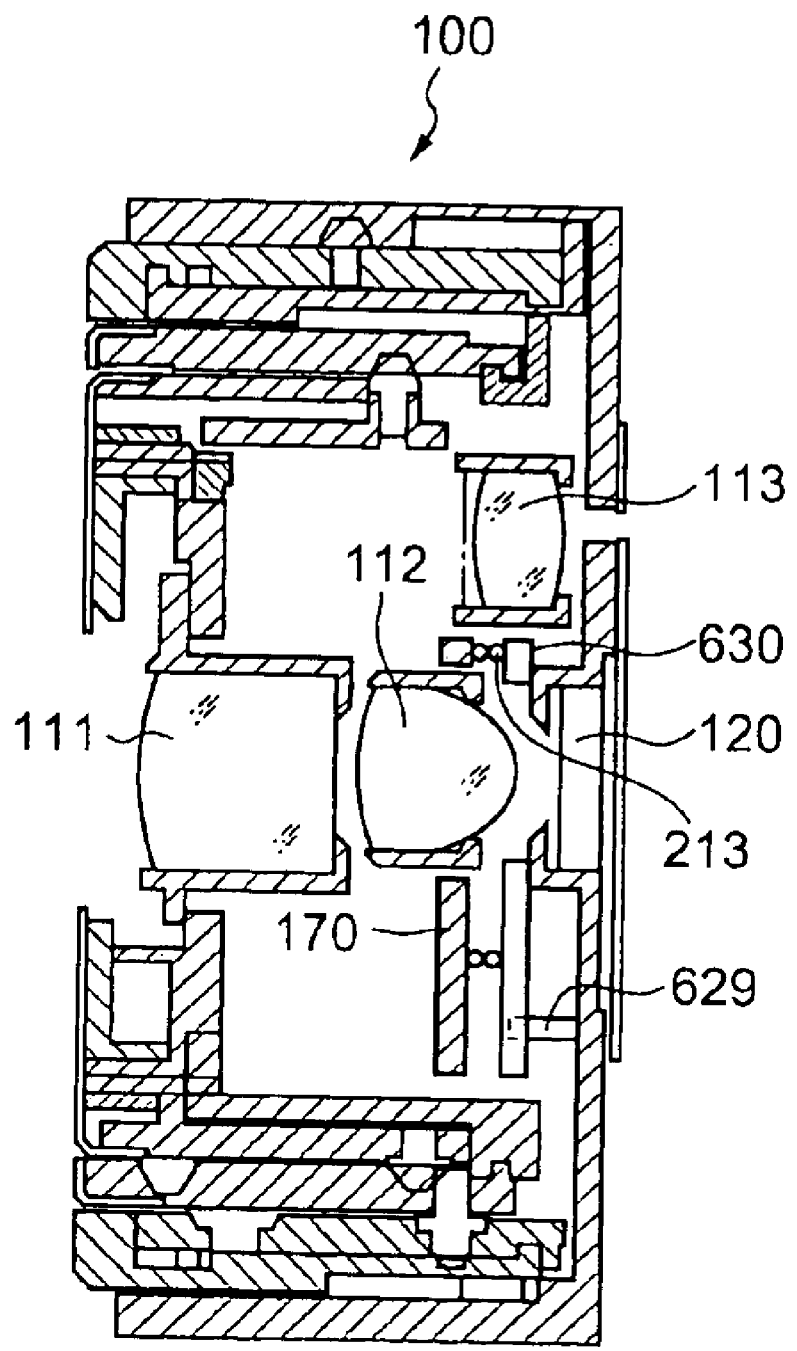
FIG. 31 is a sectional view of the fourth embodiment when the lens barrel is retracted.

FIG. 31 is a sectional view of the embodiment when the lens barrel is retracted.

FIG. 31 shows the sectional view corresponding to FIG. 14 showing the first embodiment. According to the fourth embodiment, the focus lens 113 retracts into the dent 104 from the optical axis when the lens barrel is retracted, and the state where the rear lens group 112 enters into the opening 631 of the aperture unit 630 is maintained. Therefore, the size when the lens barrel is retracted can be reduced as compared with the conventional technique, and it is possible to provide a thin camera having excellent carrying-easiness.

When the aperture blade 634 exists in the opening 631 of the aperture unit 630 as shown in part (b) of FIG. 30, even if the rear lens group 112 tries to enter into the opening 631 of the aperture unit 630 due to a malfunction of a lens control system or mechanical impact during use, the engaging rod 629 comes into contact with the cam section 634b of the aperture blade 634 before the rear lens group 112 comes into contact with the aperture blade 634, and the aperture blade 634 moves into the retracted state shown in part (a) of FIG. 30. Therefore, there is no possibility that the rear lens group 112 abuts against the aperture blade 634, and it is possible to shorten the barrel length while securing the reliability of the structural strength.

Although the focus lens 113 retracts into the dent 104 in this embodiment, the present invention is not limited to this, and the focus lens 113 may retract into the front lens group side 106. Alternatively, one of the one lens group of the three lens groups including the front lens group, or the front lens group 111 and one of the rear lens group 112 and the focus lens 113 may be retracted, or the rear lens group 112 and one of the front lens group 111 and the focus lens 113 may be retracted, or all of the three lens groups may be retracted to one of or both of the front lens group side 106 and the dent 104.

A fifth embodiment of the invention will be explained.

Figure 32:
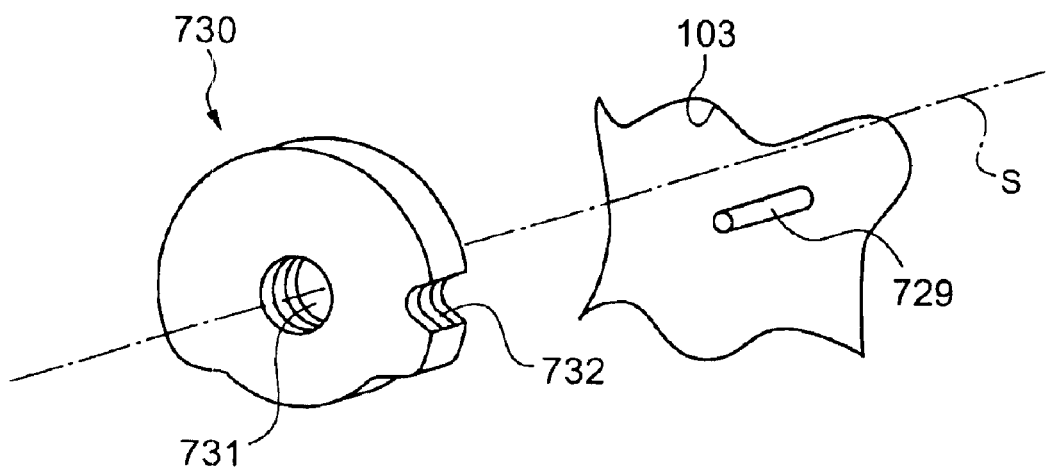
FIG. 32 is a perspective view of an outward appearance of the aperture member of the fourth embodiment.

FIG. 32 is a perspective view showing an outward appearance of the aperture member of the fifth embodiment.

FIG. 32 shows an aperture unit 730 similar to the aperture unit 630 shown in FIG. 29 in outward appearance, and an engaging rod 729 (engaging member) extending from the wall member 103 toward the aperture unit in the optical axis direction. In the fifth embodiment, the aperture unit and the engaging rod are only slightly different from those in the fourth embodiment and thus, explanation of the same portions will be omitted. This aperture unit 730 includes a circular opening 731 formed around the optical axis S. The opening 731 is opened to such a size that the rear lens group 112 can enter in the opening 731 when the lens barrel is retracted, and an amount of light is adjusted at the time of shooting. The aperture unit 730 includes a notch 732 on an extension line of the engaging rod 729. The engaging rod 729 can enter in the notch 732 when the lens barrel is retracted.

Figure 33:
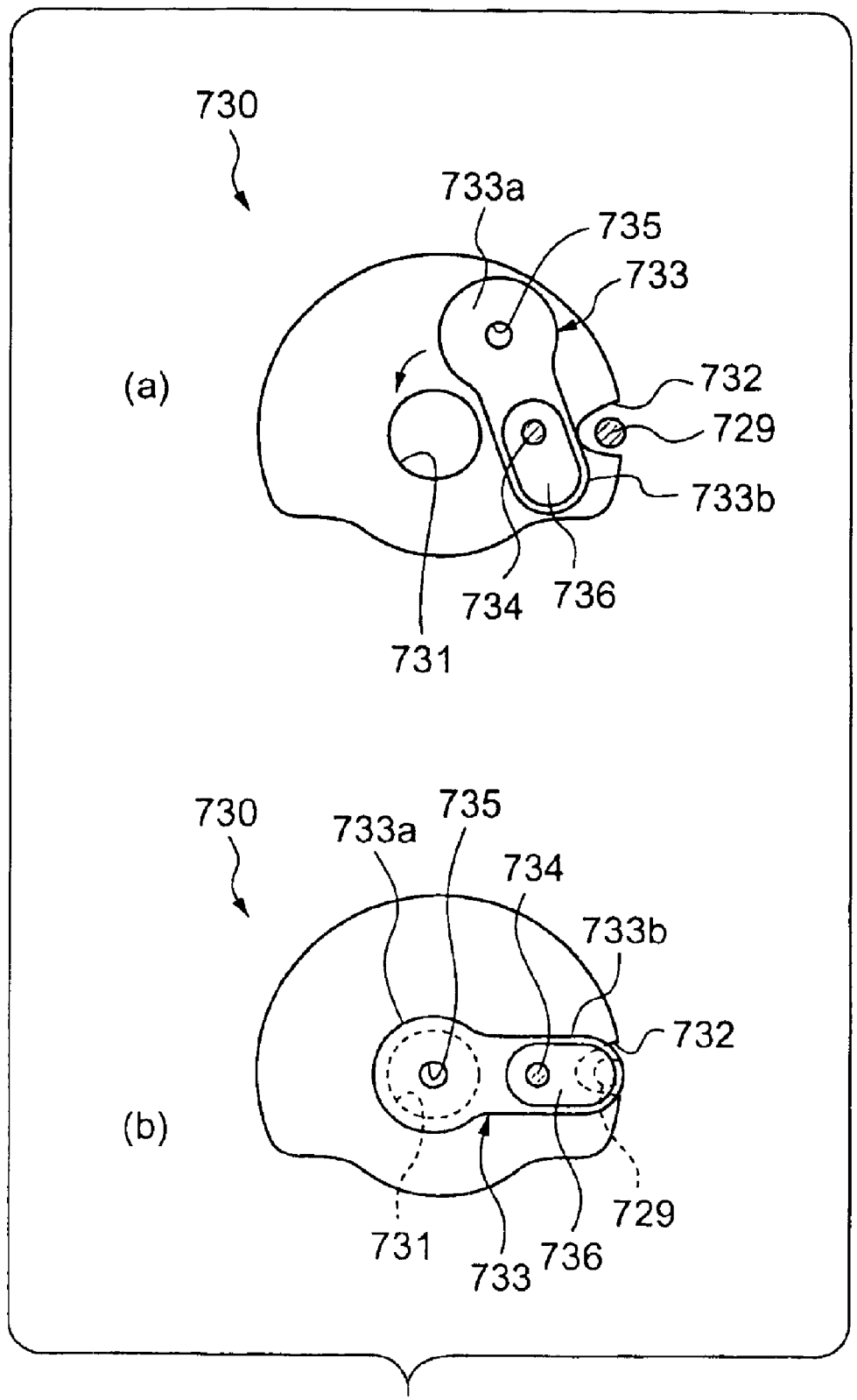
FIG. 33 is a schematic diagram showing one example of the structure of the aperture blade of the aperture unit and operation thereof.

FIG. 33 is a schematic diagram showing one example of a structure of the aperture blade of the aperture unit and operation thereof. The aperture blade 733 can turn around the shaft 734 between an opened position, i.e., the retracted state shown in part (a) of FIG. 33 and a small aperture position, i.e., non-retracted state shown in part (b) of FIG. 33. A driving source which turns the aperture blade 733 around the shaft 734 is not illustrated in the drawings. The aperture blade 733 includes a plate 733a formed on one side of the shaft 734. The plate 733a has such a size that the plate 733a retracts beside the opening 731 of the aperture unit 730 at the time of opening and does not interfere with the opening 731 but can close the opening 731 at the time of small aperture (non-retracted state). A small hole 735 is formed in a central portion of the plate 733a through which light passes. A plate 733b (restraining member) is provided on a side of the aperture blade 733 opposite from the plate 733a with respect to the shaft 734. The plate 733b does not interfere with the notch 732 of the aperture unit 730 at the time of opening but closes the notch 732 at the time of small aperture, thereby restraining the engaging rod 729 from entering into the notch 732. A reinforcing plate 736 for increasing the strength of the plate 733b is provided on the plate 733b. Instead of providing the reinforcing plate 736 which is separate from the plate 733b, the thickness of the plate 733b itself may be increased.

By providing the engaging rod 729 and the aperture blade 733 having such structures, the aperture blade 733 moves to the retracted state as shown in part (a) of FIG. 33 when the lens barrel is retracted to open the opening 731 and the notch 732 of the aperture unit 730. Thus, the rear lens group 112 is allowed to enter into the opening 731 and the engaging rod 729 is allowed to enter into the notch 732. Therefore, the length of the barrel can be shortened.

When the aperture blade 733 exists in the non-retracted state as shown in part (b) of FIG. 33, if the rear lens group moves toward the aperture unit 730 due to a malfunction of a lens control system or a light amount control system or mechanical impact during use, the plate 733b of the aperture blade 733 abuts against the tip end of the engaging rod 729 before the aperture blade 733 in the non-retracted state and the rear lens group 112 come into contact with each other, thereby preventing the rear lens group and the aperture unit 730 from further approaching each other. Therefore, there is no possibility that the rear lens group comes into contact with the aperture unit 730 and the aperture blade 733 is destroyed.

As apparent from the above explanation, according to the fifth embodiment, when the aperture blade 733 exists in the opening 731 of the aperture unit 730 as shown in part (b) of FIG. 33, i.e., when the aperture blade 733 is in the non-retracted state, even if the rear lens group 112 tries to enter into the opening 731 of the aperture unit 730 due to a malfunction of a light amount control system or mechanical impact during use, the plate 733b of the aperture blade 733 abuts against the tip end of the engaging rod 729 before the aperture blade 733, thereby preventing the rear lens group 112 and the aperture unit 730 from further approaching each other. Therefore, there is no possibility that the rear lens group 112 abuts against the aperture blade 733, and the length of the barrel can be shortened while securing the reliability of the structural strength. Although the engaging rod is provided on the wall member 103 in the fourth and fifth embodiments, the present invention is not limited to this, and the rear lens group guide frame may have the engaging rod.

Although the digital camera is of the retract type in each of the above embodiments, the lens barrel does not always need to retract completely in this invention, and the invention can also be applied to any digital cameras only if the length of the lens barrel can be changed between the accommodated state having a relatively short barrel length and the shooting state having a relatively long barrel length.

Although the aperture unit 179 is mounted on the side of the rear lens group and the lens shutter unit is mounted on the side of the focus lens in the embodiments, the lens shutter unit may be mounted on the side of the rear lens group and the aperture unit may be mounted on the side of the focus lens on the contrary. Although the digital camera has both the aperture and the shutter in the embodiments, the digital camera may have a unit functioning as both the aperture and the shutter.

Although the embodiments have been explained mainly based on the digital camera for taking a freeze-frame picture, the invention can also be applied to a digital camera for shooting a moving video picture or a digital camera for shooting both the freeze-frame picture and moving video picture. In the embodiments, the shooting lens has three lens groups, i.e., the front lens group, the rear lens group and the focus lens arranged in this order from forward in the optical axis direction, the focal length can be changed, and the focus is adjusted by moving the focus lens. The invention is not limited to this, and the invention can also be applied to a general digital camera in which lens groups including the focus lens are arranged on the optical axis, the focal length can be changed, and the digital camera has a shooting lens which adjusts the focus by moving the focus lens.

What is claimed is:

1. A shooting apparatus which images a subject light on an image pickup element to produce an image signal, comprising:

a lens barrel which incorporates, therein, a shooting lens comprising a plurality of lens groups, a length of the lens barrel can be changed between an accommodated state having a relatively short barrel length and a shooting state having a relatively long barrel length, wherein the lens barrel comprises:

a lens retracting mechanism which allows at least one of the lens groups to retract from a shooting optical axis when the lens barrel is brought into the accommodated state, and which allows the retracted lens group to advance to the shooting optical axis when the lens barrel is brought into the shooting state; and a light amount control member which is in a using state in which an amount of shooting light passing through the shooting lens is controlled when the lens barrel is in the shooting state, and which is in non-using state in which an opening is left opening at a predetermined opening diameter when the lens barrel is in the accommodated state, and which receives at least one of the lens groups in the opening when the lens barrel is in the accommodated state.

2. The shooting apparatus according to claim 1, wherein the shooting lens comprises three lens groups, i.e., a front lens group, a rear lens group and a focus lens arranged in this order from forward in the optical axis direction, a focal length can be changed, and a focus is adjusted by moving the focus lens.

3. The shooting apparatus according to claim 2, wherein the light amount control member is fixed to a rear lens group guide frame which defines a position of the rear lens group in the optical axis direction, the lens retracting mechanism retracts the focus lens from the shooting optical axis when the lens barrel is brought into the accommodated state, and the light amount control member receives the front lens group in the opening when the lens barrel is in the accommodated state.

4. The shooting apparatus according to claim 2, wherein the light amount control member is fixed to a rear lens group guide frame which defines a position of the rear lens group in the optical axis direction, the lens retracting mechanism includes a rear lens group holding frame which holds the rear lens group and is rotatably supported by the rear lens group guide frame, the rear lens group holding frame is turned to retract the rear lens group from the shooting optical axis when the lens barrel is brought into the accommodated state, and the focus lens is received in the opening of the light amount control member when the lens barrel is in the accommodated state.

5. The shooting apparatus according to claim 1, wherein the light amount control member is biased by a spring in a direction away from a rear lens group guide frame which defines a position of the rear lens group in the optical axis direction, and is supported by the rear lens group guide frame, the lens retracting mechanism retracts the focus lens from the shooting optical axis when the lens barrel is brought into the accommodated state, and the light amount control member is pushed toward the rear lens group guide frame and the rear lens group is received in the opening of the light amount control member when the lens barrel is brought into the accommodated state.

6. A shooting apparatus which images a subject light on an image pickup element to produce an image signal, comprising:

a lens barrel which incorporates, therein, a shooting lens comprising a plurality of lens groups, a length of the lens barrel can be changed between an accommodated state having a relatively short barrel length and a shooting state having a relatively long barrel length, wherein the lens barrel comprises:

a lens retracting mechanism which allows at least one of the lens groups to retract from a shooting optical axis when the lens barrel is brought into the accommodated state, and which allows the retracted lens group to advance to the shooting optical axis when the lens barrel is brought into the shooting state; and a light amount control member which is in a using state in which an amount of shooting light passing through the shooting lens is controlled when the lens barrel is in the shooting state, and which is in non-using state in which an opening is left opening at a predetermined opening diameter when the lens barrel is in the accommodated state, and which receives the image pickup element in the opening when the lens barrel is in the accommodated state.

7. The shooting apparatus according to claim 6, wherein the shooting lens comprises three lens groups, i.e., a front lens group, a rear lens group and a focus lens arranged in this order from forward in the optical axis direction, a focal length can be changed, and a focus is adjusted by moving the focus lens, the light amount control member is fixed to a rear lens group guide frame which defines a position of the rear lens group in the optical axis direction, and the lens retracting mechanism retracts the focus lens from the shooting optical axis when the lens barrel is brought into the accommodated state.

8. The shooting apparatus according to claim 1, wherein the light amount control member is a lens shutter.

9. The shooting apparatus according to claim 6, wherein the light amount control member is a lens shutter.

10. The shooting apparatus according to claim 1, wherein the light amount control member is an aperture member.

11. The shooting apparatus according to claim 6, wherein the light amount control member is an aperture member.

12. The shooting apparatus according to claim 1, further comprising an interfering member which interferes with the light amount control member to maintain the light amount control member in the non-using state when the lens barrel is in the accommodated state.

13. The shooting apparatus according to claim 6, further comprising an interfering member which interferes with the light amount control member to maintain the light amount control member in the non-using state when the lens barrel is in the accommodated state.

14. A lens barrel incorporating, therein, a shooting lens comprising a plurality of lens groups, in which a length of the lens barrel can be changed between an accommodated state having a relatively short barrel length and a shooting state having a relatively long barrel length, the lens barrel comprising:

a lens retracting mechanism which allows at least one of the lens groups to retract from a shooting optical axis when the lens barrel is brought into the accommodated state, and which allows the retracted lens group to advance to the shooting optical axis when the lens barrel is brought into the shooting state; and a light amount control member which is in a using state in which an amount of shooting light passing through the shooting lens is controlled when the lens barrel is in the shooting state, and which is in non-using state in which an opening is left opening at a predetermined opening diameter when the lens barrel is in the accommodated state, and which receives at least one of the lens groups in the opening when the lens barrel is in the accommodated state.

15. The lens barrel according to claim 14, wherein the shooting lens comprises three lens groups, i.e., a front lens group, a rear lens group and a focus lens arranged in this order from forward in the optical axis direction, a focal length can be changed, and a focus is adjusted by moving the focus lens.

16. The lens barrel according to claim 15, wherein the light amount control member is fixed to a rear lens group guide frame which defines a position of the rear lens group in the optical axis direction, the lens retracting mechanism retracts the focus lens from the shooting optical axis when the lens barrel is brought into the accommodated state, and the light amount control member receives the front lens group in the opening when the lens barrel is in the accommodated state.

17. The lens barrel according to claim 15, wherein the light amount control member is fixed to a rear lens group guide frame which defines a position of the rear lens group in the optical axis direction, the lens retracting mechanism includes a rear lens group holding frame which holds the rear lens group and is rotatably supported by the rear lens group guide frame, the rear lens group holding frame is turned to retract the rear lens group from the shooting optical axis when the lens barrel is brought into the accommodated state, and the focus lens is received in the opening of the light amount control member when the lens barrel is in the accommodated state.

18. The lens barrel according to claim 14, wherein the light amount control member is biased by a spring in a direction away from a rear lens group guide frame which defines a position of the rear lens group in the optical axis direction, and is supported by the rear lens group guide frame, the lens retracting mechanism retracts the focus lens from the shooting optical axis when the lens barrel is brought into the accommodated state, the light amount control member is pushed toward the rear lens group guide frame and the rear lens group is received in the opening of the light amount control member when the lens barrel is brought into the accommodated state.

19. A lens barrel incorporating, therein, a shooting lens comprising a plurality of lens groups, in which a length of the lens barrel can be changed between an accommodated state having a relatively short barrel length and a shooting state having a relatively long barrel length, the lens barrel comprising:

an image pickup element which produces an image signal when the shooting lens images a subject light;

a lens retracting mechanism which allows at least one of the lens groups to retract from a shooting optical axis when the lens barrel is brought into the accommodated state, and which allows the retracted lens group to advance to the shooting optical axis when the lens barrel is brought into the shooting state; and a light amount control member which is in a using state in which an amount of shooting light passing through the shooting lens is controlled when the lens barrel is in the shooting state, and which is in non-using state in which an opening is left opening at a predetermined opening diameter when the lens barrel is in the accommodated state, and which receives the image pickup element in the opening when the lens barrel is in the accommodated state.

20. The lens barrel according to claim 19, wherein the shooting lens comprises three lens groups, i.e., a front lens group, a rear lens group and a focus lens arranged in this order from forward in the optical axis direction, a focal length can be changed, and a focus is adjusted by moving the focus lens, the light amount control member is fixed to a rear lens group guide frame which defines a position of the rear lens group in the optical axis direction, and the lens retracting mechanism retracts the focus lens from the shooting optical axis when the lens barrel is brought into the accommodated state.

21. The lens barrel according to claim 14, wherein the light amount control member is a lens shutter.

22. The lens barrel according to claim 19, wherein the light amount control member is a lens shutter.

23. The lens barrel according to claim 14, wherein the light amount control member is an aperture member.

24. The lens barrel according to claim 19, wherein the light amount control member is an aperture member.

25. The lens barrel according to claim 14, further comprising an interfering member which interferes with the light amount control member to maintain the light amount control member in the non-using state when the lens barrel is in the accommodated state.

26. The lens barrel according to claim 19, further comprising an interfering member which interferes with the light amount control member to maintain the light amount control member in the non-using state when the lens barrel is in the accommodated state.

* * * * *